(12) United States Patent
He et al.

(10) Patent No.: US 11,910,428 B2
(45) Date of Patent: Feb. 20, 2024

(54) INTRA-FREQUENCY MEASUREMENT OF LAYER 3 BASED CHANNEL STATE INFORMATION REFERENCE SIGNALS

(71) Applicant: QUALCOMM Incorporated, San Diego, CA (US)

(72) Inventors: Qunfeng He, San Diego, CA (US); Huilin Xu, Temecula, CA (US); Carlos Cabrera Mercader, Cardiff, CA (US)

(73) Assignee: QUALCOMM Incorporated, San Diego, CA (US)

( * ) Notice: Subject to any disclaimer, the term of this patent is extended or adjusted under 35 U.S.C. 154(b) by 190 days.

(21) Appl. No.: 17/503,104

(22) Filed: Oct. 15, 2021

(65) Prior Publication Data

US 2023/0121185 A1    Apr. 20, 2023

(51) Int. Cl.
*H04W 72/542* (2023.01)
*H04W 72/0446* (2023.01)
*H04W 72/0453* (2023.01)
*H04W 72/1273* (2023.01)
*H04L 5/00* (2006.01)

(52) U.S. Cl.
CPC ......... *H04W 72/542* (2023.01); *H04L 5/0051* (2013.01); *H04W 72/0446* (2013.01); *H04W 72/0453* (2013.01); *H04W 72/1273* (2013.01)

(58) Field of Classification Search
CPC ........... H04W 72/542; H04W 72/0446; H04W 72/0453; H04W 72/1273; H04L 5/0051
See application file for complete search history.

(56) References Cited

U.S. PATENT DOCUMENTS

| | | | |
|---|---|---|---|
| 2013/0235743 A1* | 9/2013 | Goldhamer | H04W 52/243 370/252 |
| 2015/0215940 A1* | 7/2015 | Goldhamer | H04W 24/10 370/252 |
| 2020/0067674 A1* | 2/2020 | Guan | H04L 5/00 |
| 2021/0367741 A1* | 11/2021 | Yiu | H04W 36/0088 |
| 2022/0353028 A1* | 11/2022 | Guan | H04L 1/0026 |
| 2022/0353126 A1* | 11/2022 | Cui | H04L 5/0048 |

* cited by examiner

*Primary Examiner* — Kent Krueger
(74) *Attorney, Agent, or Firm* — QUALCOMM Incorporated

(57) ABSTRACT

Techniques and apparatus for intra-frequency measurement of Layer 3 (L3)-based channel state information reference signals (CSI-RSs) are described. An example method that may be performed by a user equipment (UE) includes transmitting an indication based on a UE capability to simultaneously receive downlink data from a serving cell on one or more first resources and measure one or more CSI-RSs from a target cell on one or more second resources. The one or more first resources at least partially overlap the one or more second resources in a time domain and a frequency domain. The method also includes performing a CSI-RS measurement procedure, based on the UE capability.

30 Claims, 11 Drawing Sheets

INTRA-FREQUENCY MEASUREMENT OF LAYER 3 BASED CHANNEL STATE INFORMATION REFERENCE SIGNALS

BACKGROUND

Field of the Disclosure

Aspects of the present disclosure relate to wireless communications, and more particularly, to techniques and apparatus for performing enhanced intra-frequency measurements of Layer 3 (L3)-based channel state information reference signals (CSI-RSs).

Description of Related Art

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

These multiple access technologies have been adopted in various telecommunication standards to provide a common protocol that enables different wireless devices to communicate on a municipal, national, regional, and even global level. New radio (e.g., 5G NR) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. These improvements should be applicable to other multi-access technologies and the telecommunication standards that employ these technologies.

SUMMARY

The systems, methods, and devices of the disclosure each have several aspects, no single one of which is solely responsible for its desirable attributes. After considering this discussion, and particularly after reading the section entitled "Detailed Description" one will understand how the features of this disclosure provide advantages that include techniques and apparatus for improving the accuracy of intra-frequency CSI-RS L3 measurements.

Certain aspects of the subject matter described in this disclosure can be implemented in a method for wireless communication by a user equipment (UE). The method generally includes transmitting an indication based on a UE capability to simultaneously receive downlink data from a serving cell on one or more first resources and measure one or more channel state information (CSI) reference signals (CSI-RSs) from a target cell on one or more second resources. The one or more first resources at least partially overlap the one or more second resources in a time domain and a frequency domain. The method further includes performing a CSI-RS measurement procedure, based on the UE capability.

Certain aspects of the subject matter described in this disclosure can be implemented in an apparatus for wireless communication. The apparatus generally includes a transmitter, at least one processor, and a memory coupled with the at least one processor. The transmitter is configured to transmit an indication based on a capability of the apparatus to simultaneously receive downlink data from a serving cell on one or more first resources and measure one or more CSI-RSs from a target cell on one or more second resources. The one or more first resources at least partially overlap the one or more second resources in a time domain and a frequency domain. The at least one processor is configured to perform a CSI-RS measurement procedure, based on the capability.

Certain aspects of the subject matter described in this disclosure can be implemented in an apparatus for wireless communication. The apparatus generally includes means for transmitting an indication based on a capability of the apparatus to simultaneously receive downlink data from a serving cell on one or more first resources and measure one or more CSI-RSs from a target cell on one or more second resources. The one or more first resources at least partially overlap the one or more second resources in a time domain and a frequency domain. The apparatus also includes means for performing a CSI-RS measurement procedure, based on the capability.

Certain aspects of the subject matter described in this disclosure can be implemented in a computer-readable medium for wireless communication by a UE. The computer-readable medium includes computer-executable instructions that, when executed by one or more processors of a processing system, cause the processing system to: transmit an indication based on a UE capability to simultaneously receive downlink data from a serving cell on one or more first resources and measure one or more CSI-RSs from a target cell on one or more second resources, wherein the one or more first resources at least partially overlap the one or more second resources in a time domain and a frequency domain; and perform a CSI-RS measurement procedure, based on the UE capability.

Certain aspects of the subject matter described in this disclosure can be implemented in a method for wireless communication by a base station in a serving cell. The method generally includes receiving, from a UE, a first indication of whether the UE has a capability to simultaneously receive downlink data from the serving cell on one or more first resources and measure one or more CSI-RSs from a first target cell on one or more second resources. The one or more first resources at least partially overlap the one or more second resources in a time domain and a frequency domain. The method also includes determining a configuration for scheduling transmission of the downlink data on the one or more first resources, based in part on the first indication. The method further includes transmitting a second indication of the configuration to the UE.

Certain aspects of the subject matter described in this disclosure can be implemented in an apparatus for wireless communication. The apparatus generally includes a receiver, a transmitter, at least one processor, and a memory coupled to the at least one processor. The receiver is configured to receive, from a UE, a first indication of whether the UE has a capability to simultaneously receive downlink data from a serving cell on one or more first resources and measure one or more CSI-RSs from a first target cell on one or more second resources. The one or more first resources at least partially overlap the one or more second resources in a time domain and a frequency domain. The at least one processor is configured to determine a configuration for scheduling transmission of the downlink data on the one or more first resources, based in part on the first indication. The transmitter is configured to transmit a second indication of the configuration to the UE.

Certain aspects of the subject matter described in this disclosure can be implemented in an apparatus for wireless communication. The apparatus generally includes means for receiving, from a UE, a first indication of whether the UE has a capability to simultaneously receive downlink data from a serving cell on one or more first resources and measure one or more CSI-RSs from a first target cell on one or more second resources. The one or more first resources at least partially overlap the one or more second resources in a time domain and a frequency domain. The apparatus also includes means for determining a configuration for scheduling transmission of the downlink data on the one or more first resources, based in part on the first indication. The apparatus further includes means for transmitting a second indication of the configuration to the UE.

Certain aspects of the subject matter described in this disclosure can be implemented in a computer-readable medium for wireless communication by a base station. The computer-readable medium includes computer-executable instructions that, when executed by one or more processors of a processing system, cause the processing system to: receive, from a UE, a first indication of whether the UE has a capability to simultaneously receive downlink data from the serving cell on one or more first resources and measure one or more CSI-RSs from a first target cell on one or more second resources, wherein the one or more first resources at least partially overlap the one or more second resources in a time domain and a frequency domain; determine a configuration for scheduling transmission of the downlink data on the one or more first resources, based in part on the first indication; and transmit a second indication of the configuration to the UE.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain aspects of this disclosure and the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
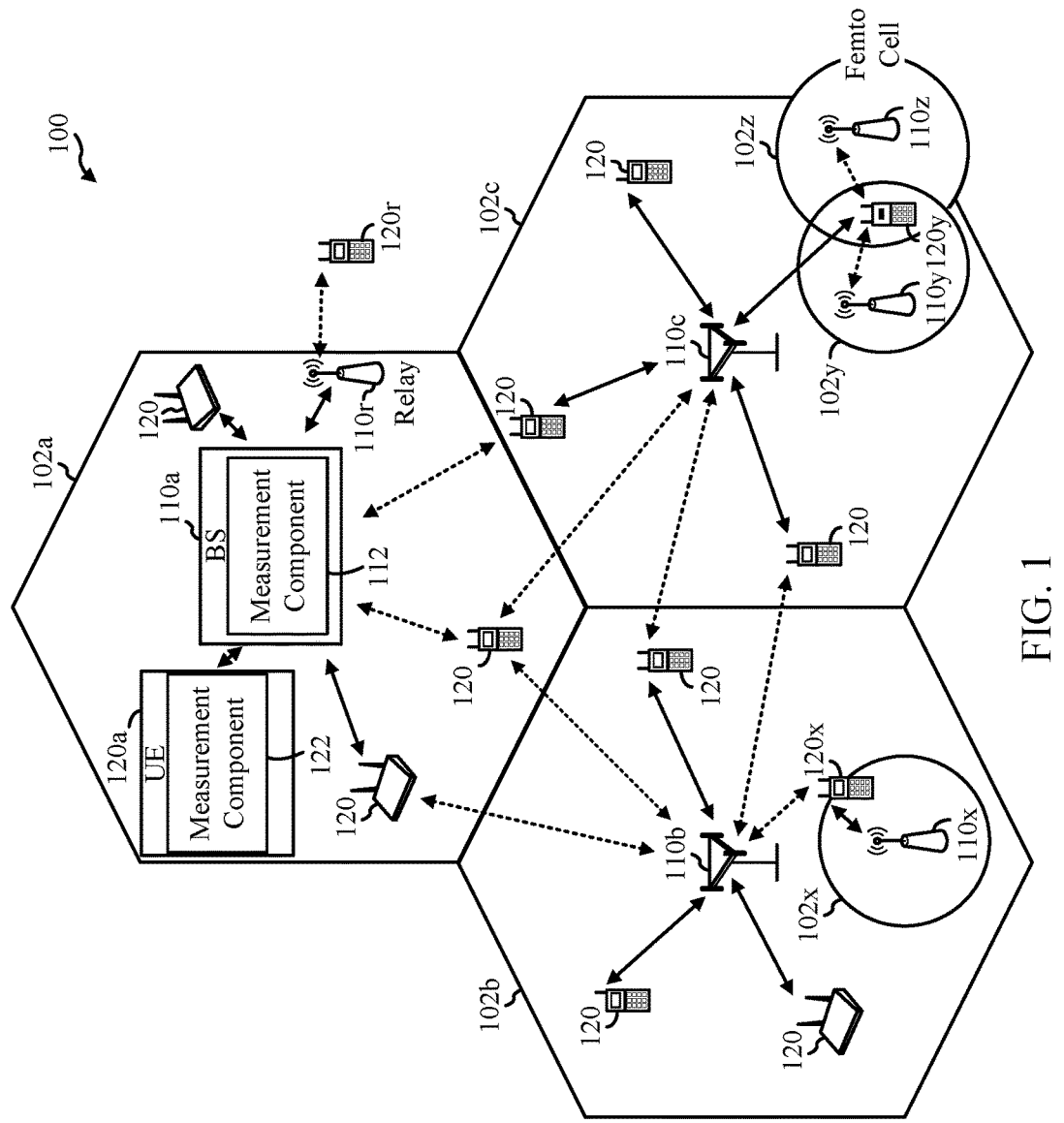
FIG. 1 is a block diagram conceptually illustrating an example wireless communication network, in accordance with certain aspects of the present disclosure.
Figure 1:
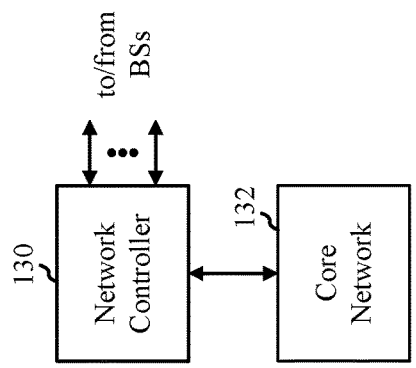

Aspects of the present disclosure provide apparatus, methods, processing systems, and computer readable mediums for enhanced intra-frequency measurement of Layer 3 (L3)-based channel state information (CSI) reference signals (RSs) (CSI-RSs). In particular, aspects described herein can improve the accuracy of intra-frequency CSI-RS L3 measurements, for example, in situations where there is a timing offset between a serving cell and one or more neighbor cells.

For example, certain wireless communication systems (e.g., 5G NR systems) may support a certain type of reference signal (e.g., CSI-RS) for radio resource management (RRM) and/or mobility management (or mobility control). In certain cases, this reference signal may be referred to as a L3 CSI-RS (or CSI-RS L3). A L3 CSI-RS may be a periodic, wideband signal. For CSI-RS based RRM/mobility management, the network may configure the UE with a UE-specific CSI-RS for L3 mobility.

In certain wireless communication systems, such as 5G NR, the network may configure multiple cells (including the serving cell and target (neighbor) cell) to transmit a CSI-RS (e.g., in a different direction). For example, each neighbor cell can transmit its own CSI-RS (in a different direction) for a UE to measure. In certain cases, the serving cell and one or more neighbor cells may transmit on the same frequency or range of frequencies (e.g., intra-frequency transmissions).

In some cases, when performing intra-frequency measurement of L3 CSI-RSs, the UE may share certain processing resources (e.g., a Fourier transform module (such as a Fast Fourier Transform (FFT) block), a sampling window (or FFT window), processor(s), etc.) for processing signals from the serving cell and neighbor cell(s). For example, certain UEs may be configured to use a single FFT for multiple cell measurements per frequency layer for intra-frequency CSI-RS L3 measurement. In this example, the UE may use the single FFT (with a single sampling window) to process data (e.g., physical downlink shared channel (PDSCH) transmissions) from the serving cell and measurements of CSI-RS L3 from the neighbor cell(s).

One challenge with sharing processing resources, such as a FFT block, in this manner is that it can lead to inaccuracy in the L3 CSI-RS measurement. For example, in certain networks (e.g., Release 16 5G NR), the network may configure the UE to perform intra-frequency measurement of CSI-RS L3 without the use of measurement gaps (e.g., a gapless intra-frequency CSI-RS L3 measurement). In these cases, the UE may be configured to follow the serving cell timing for processing both serving cell data traffic and the measurement on CSI-RS L3 resources, for both the serving and neighboring cells. However, when there is a large timing difference (or timing offset) (e.g., above a threshold timing difference) between the serving cell and the neighbor cell, using the FFT (with a sampling window) configured with the serving cell timing can significantly impact (e.g., degrade) the accuracy of the CSI-RS L3 measurement from the neighbor cells, and in turn, significantly reduce the performance of the network.

To address this, aspects described herein may enable a UE in a serving cell to perform CSI-RS L3 measurement based RRM and/or mobility management, based on a capability of the UE associated with intra-frequency CSI-RS L3 measurement. As described below, some UEs may have a capability to perform intra-frequency CSI-RS L3 measurement without sharing certain processing resources (e.g., FFT, same sampling window, etc.). For example, these UEs may be configured with multiple FFTs (each with a different configured sampling window), which allow the UEs to simultaneously process data traffic from the serving cell and measurements of CSI-RS L3 from the target cell (e.g., in the same symbol). For instance, a UE can use a first FFT (with a sampling window configured based on the serving cell timing) to process data traffic from the serving cell and a second FFT (with a sampling window configured based on the target cell timing) to process measurements of CSI-RS L3 from the target cell.

As also described below, some UEs may not have a capability to perform intra-frequency CSI-RS L3 measurement without sharing certain processing resources. These UEs, for example, may have to use a single FFT (with a single configured sampling window) to process both data traffic from the serving cell and measurements of CSI-RS L3 from the target cell.

The UE may send an indication to a network entity (e.g., gNB) in the serving cell of the UE's capability (or lack thereof) associated with intra-frequency CSI-RS L3 measurement. The network entity may determine whether to restrict downlink scheduling of downlink data transmissions, based on the indication. For example, the network entity may refrain from restricting downlink scheduling (by disabling blanking on resources) when the UE does have a capability to perform intra-frequency CSI-RS L3 measurement without sharing certain processing resources. In another example, the network entity may restrict downlink scheduling (by enabling blanking on resources) when the UE does not have a capability to perform intra-frequency CSI-RS L3 measurement without sharing certain processing resources. The network entity may transmit an indication of the determination of whether to restrict downlink scheduling to the UE.

In this manner, aspects provide techniques which allow certain UEs to simultaneously perform data reception and CSI-RS L3 measurement and/or techniques which allow certain UEs to prioritize CSI-RS L3 measurements. These aspects can significantly improve the accuracy of intra-frequency CSI-RS L3 measurement (relative to conventional techniques), and in turn improve the performance of the network, during RRM and/or mobility management, for example.

The following description provides examples of enhanced intra-frequency measurement of L3-based CSI-RSs in communication systems. Changes may be made in the function and arrangement of elements discussed without departing from the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs.

The techniques described herein may be used for various wireless networks and radio technologies. While aspects may be described herein using terminology commonly associated with 3G, 4G, and/or new radio (e.g., 5G NR) wireless technologies, aspects of the present disclosure can be applied in other generation-based communication systems.

NR access may support various wireless communication services, such as enhanced mobile broadband (eMBB) targeting wide bandwidth, millimeter wave mmW, massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may coexist in the same subframe.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

NR supports beamforming and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells.

FIG. 1 illustrates an example wireless communication network 100 in which aspects of the present disclosure may be performed. For example, the wireless communication network 100 may be an NR system (e.g., a 5G NR network). As shown in FIG. 1, the wireless communication network 100 may be in communication with a core network 132. The core network 132 may in communication with one or more base station (BSs) 110a-z (each also individually referred to herein as BS 110 or collectively as BSs 110) and/or user equipment (UE) 120a-y (each also individually referred to herein as UE 120 or collectively as UEs 120) in the wireless communication network 100 via one or more interfaces.

According to certain aspects, the BSs 110 and UEs 120 may be configured to perform techniques for improving the accuracy of intra-frequency CSI-RS L3 measurement. As shown in FIG. 1, the BS 110a includes a measurement component 112, which is configured to perform one or more techniques described herein for improving the accuracy of intra-frequency CSI-RS L3 measurement, in accordance with aspects of the present disclosure. The BS 110a may use the measurement component 112 to configure downlink scheduling based in part on a capability of the UE associated with CSI-RS L3 measurement. Additionally, the UE 120a includes a measurement component 122, which is configured to perform one or more techniques described herein for improving the accuracy of intra-frequency CSI-RS L3 measurement, in accordance with aspects of the present disclosure. The UE 120a may use the measurement component 122 to perform a CSI-RS L3 measurement procedure, based in part on a capability of the UE associated with CSI-RS L3 measurement.

A BS 110 may provide communication coverage for a particular geographic area, sometimes referred to as a "cell", which may be stationary or may move according to the location of a mobile BS 110. In some examples, the BSs 110 may be interconnected to one another and/or to one or more other BSs or network nodes (not shown) in wireless communication network 100 through various types of backhaul interfaces (e.g., a direct physical connection, a wireless connection, a virtual network, or the like) using any suitable transport network. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple cells.

The BSs 110 communicate with UEs 120 in the wireless communication network 100. The UEs 120 (e.g., 120x, 120y, etc.) may be dispersed throughout the wireless communication network 100, and each UE 120 may be stationary or mobile. Wireless communication network 100 may also include relay stations (e.g., relay station 110r), also referred to as relays or the like, that receive a transmission of data and/or other information from an upstream station (e.g., a BS 110a or a UE 120r) and sends a transmission of the data and/or other information to a downstream station (e.g., a UE 120 or a BS 110), or that relays transmissions between UEs 120, to facilitate communication between devices.

A network controller 130 may be in communication with a set of BSs 110 and provide coordination and control for these BSs 110 (e.g., via a backhaul). In aspects, the network controller 130 may be in communication with a core network 132 (e.g., a 5G Core Network (5GC)), which provides various network functions such as Access and Mobility Management, Session Management, User Plane Function, Policy Control Function, Authentication Server Function, Unified Data Management, Application Function, Network Exposure Function, Network Repository Function, Network Slice Selection Function, etc.

Figure 2:
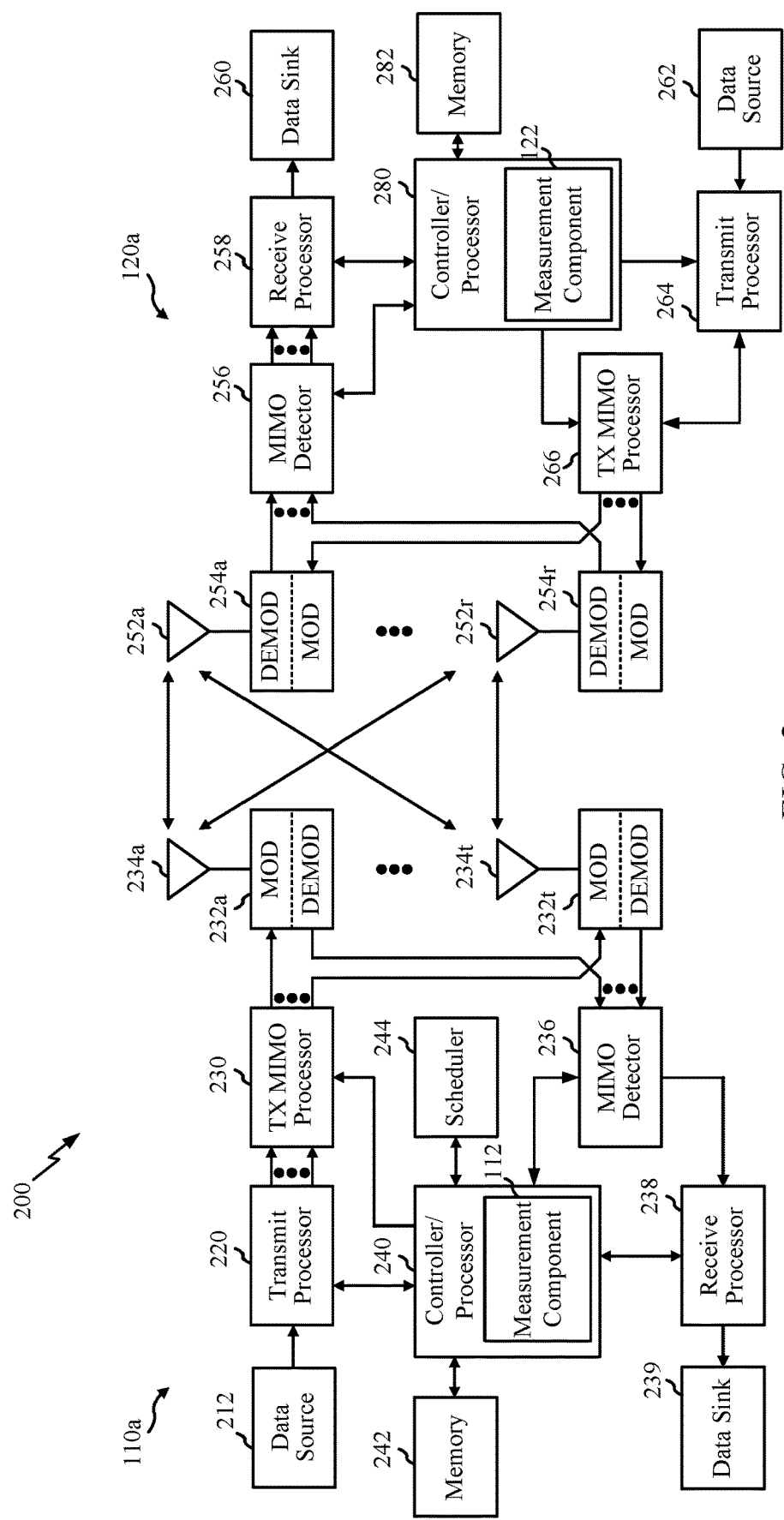
FIG. 2 is a block diagram conceptually illustrating a design of an example a base station (BS) and user equipment (UE), in accordance with certain aspects of the present disclosure.

FIG. 2 illustrates example components of BS 110a and UE 120a (e.g., the wireless communication network 100 of FIG. 1), which may be used to implement aspects of the present disclosure.

At the BS 110a, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. A medium access control (MAC)-control element (MAC-CE) is a MAC layer communication structure that may be used for control command exchange between wireless nodes. The MAC-CE may be carried in a shared channel such as a physical downlink shared channel (PDSCH), a physical uplink shared channel (PUSCH), or a physical sidelink shared channel (PSSCH).

The processor 220 may process (e.g., encode and symbol map) the data and control information to obtain data symbols and control symbols, respectively. The transmit processor 220 may also generate reference symbols, such as for the primary synchronization signal (PSS), secondary synchronization signal (SSS), PBCH demodulation reference signal (DMRS), and channel state information reference signal (CSI-RS). A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) in transceivers 232a-232t. Each modulator in transceivers 232a-232t may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from the modulators in transceivers 232a-232t may be transmitted via the antennas 234a-234t, respectively.

At the UE 120a, the antennas 252a-252r may receive the downlink signals from the BS 110a and may provide received signals to the demodulators (DEMODs) in transceivers 254a-254r, respectively. Each demodulator in transceivers 254a-254r may condition (e.g., filter, amplify, downconvert, and digitize) a respective received signal to obtain input samples. Each demodulator may further process the input samples (e.g., for OFDM, etc.) to obtain received symbols. A MIMO detector 256 may obtain received symbols from all the demodulators in transceivers 254a-254r, perform MIMO detection on the received symbols if applicable, and provide detected symbols. A receive processor 258 may process (e.g., demodulate, deinterleave, and decode) the detected symbols, provide decoded data for the UE 120a to a data sink 260, and provide decoded control information to a controller/processor 280.

On the uplink, at UE 120a, a transmit processor 264 may receive and process data (e.g., for the physical uplink shared channel (PUSCH)) from a data source 262 and control information (e.g., for the physical uplink control channel (PUCCH) from the controller/processor 280. The transmit processor 264 may also generate reference symbols for a reference signal (e.g., for the sounding reference signal (SRS)). The symbols from the transmit processor 264 may be precoded by a TX MIMO processor 266 if applicable, further processed by the modulators in transceivers 254a-254r (e.g., for SC-FDM, etc.), and transmitted to the BS 110a. At the BS 110a, the uplink signals from the UE 120a may be received by the antennas 234, processed by the demodulators in transceivers 232a-232t, detected by a MIMO detector 236 if applicable, and further processed by a receive processor 238 to obtain decoded data and control information sent by the UE 120a. The receive processor 238 may provide the decoded data to a data sink 239 and the decoded control information to the controller/processor 240.

The memories 242 and 282 may store data and program codes for BS 110a and UE 120a, respectively. A scheduler 244 may schedule UEs for data transmission on the downlink and/or uplink.

Antennas 252, processors 266, 258, 264, and/or controller/processor 280 of the UE 120a and/or antennas 234, processors 220, 230, 238, and/or controller/processor 240 of the BS 110a may be used to perform the various techniques and methods described herein. For example, as shown in FIG. 2, the controller/processor 240 of the BS 110a includes a measurement component 112, which can configure downlink scheduling based in part on a capability of the UE associated with CSI-RS L3 measurement, according to aspects described herein. As shown in FIG. 2, the controller/processor 280 of the UE 120a includes a measurement component 122, which can perform a CSI-RS measurement procedure, based in part on a capability of the UE associated with CSI-RS L3 measurement, according to aspects described herein.

NR may utilize orthogonal frequency division multiplexing (OFDM) with a cyclic prefix (CP) on the uplink and downlink. NR may support half-duplex operation using time division duplexing (TDD). OFDM and single-carrier frequency division multiplexing (SC-FDM) partition the system bandwidth into multiple orthogonal subcarriers, which are also commonly referred to as tones, bins, etc. Each subcarrier may be modulated with data. Modulation symbols may be sent in the frequency domain with OFDM and in the time domain with SC-FDM. The spacing between adjacent subcarriers may be fixed, and the total number of subcarriers may be dependent on the system bandwidth. The minimum resource allocation, called a resource block (RB), may be 12 consecutive subcarriers. The system bandwidth may also be partitioned into subbands. For example, a subband may cover multiple RBs. NR may support a base subcarrier spacing (SCS) of 15 KHz and other SCS may be defined with respect to the base SCS (e.g., 30 kHz, 60 kHz, 120 kHz, 240 kHz, etc.).

Figure 3:
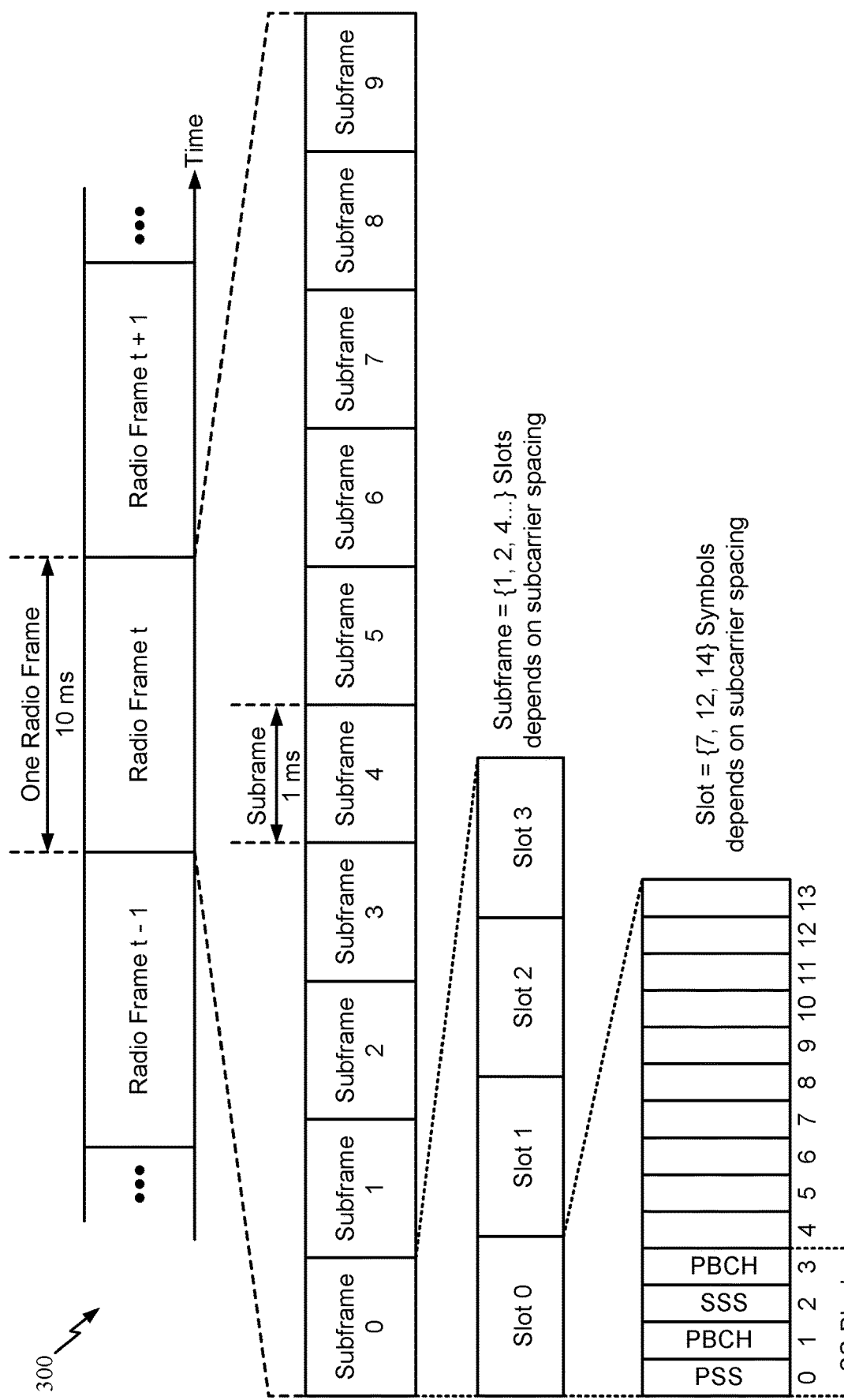
FIG. 3 is an example frame format for certain wireless communication systems (e.g., new radio (NR)), in accordance with certain aspects of the present disclosure.

FIG. 3 is a diagram showing an example of a frame format 300 for NR. The transmission timeline for each of the downlink and uplink may be partitioned into units of radio frames. Each radio frame may have a predetermined duration (e.g., 10 ms) and may be partitioned into 10 subframes, each of 1 ms, with indices of 0 through 9. Each subframe may include a variable number of slots (e.g., 1, 2, 4, 8, 16, . . . slots) depending on the SCS. Each slot may include a variable number of symbol periods (e.g., 7, 12, or 14 symbols) depending on the SCS. The symbol periods in each slot may be assigned indices. A sub-slot structure may refer to a transmit time interval having a duration less than a slot (e.g., 2, 3, or 4 symbols). Each symbol in a slot may be configured for a link direction (e.g., DL, UL, or flexible) for data transmission and the link direction for each subframe may be dynamically switched. The link directions may be based on the slot format. Each slot may include DL/UL data as well as DL/UL control information.

In NR, a synchronization signal block (SSB) is transmitted. In certain aspects, SSBs may be transmitted in a burst where each SSB in the burst corresponds to a different beam direction for UE-side beam management (e.g., including beam selection and/or beam refinement). The SSB includes a PSS, a SSS, and a two symbol PBCH. The SSB can be transmitted in a fixed slot location, such as the symbols 0-3 as shown in FIG. 3. The PSS and SSS may be used by UEs for cell search and acquisition. The PSS may provide half-frame timing, the SS may provide the CP length and frame timing. The PSS and SSS may provide the cell identity. The PBCH carries some basic system information, such as downlink system bandwidth, timing information within radio frame, SS burst set periodicity, system frame number, etc. The SSBs may be organized into SS bursts to support beam sweeping. Further system information such as, remaining minimum system information (RMSI), system information blocks (SIBs), other system information (OSI) can be transmitted on a physical downlink shared channel (PDSCH) in certain subframes. The SSB can be transmitted up to sixty-four times, for example, with up to sixty-four different beam directions for mmWave. The multiple transmissions of the SSB are referred to as a SS burst set. SSBs in an SS burst set may be transmitted in the same frequency region, while SSBs in different SS bursts sets can be transmitted at different frequency regions.

As noted, in certain wireless communication systems (e.g., 5G NR systems), L3 CSI-RS may be employed for RRM and/or mobility management (also referred to as mobility control). A L3 CSI-RS may be a periodic, wideband signal. The L3 CSI-RS may have a resource configuration, which is specified via a frequency domain density (D) and a number of resource blocks (RBs) given by PRB, a time domain periodicity P, slot and symbol indices, a CDM group index j corresponding to time/frequency locations (k,l) of resource elements within a CDM group, and associated $SSB_i$ of $Cell_k$ that is quasi collocated (QCLed) with $CSI-RS_j$, configured as a reference cell timing for reading the samples of CSI-RS signal. An example configuration may be D=3, PRB=48, P=20 ms, where the slot and symbol indices may be specified according to the network operator.

In a multi-cell deployment, the radio access network (RAN) may assign multiple cells (including the serving cell and neighbor cell(s)) to transmit a CSI-RS in a different direction to provide fine or dense coverage. The CSI-RS L3 may be used for L3 measurements for mobility management, such as cell level measurements. Every neighbor cell can transmit its own CSI-RS for a UE to measure. The CSI-RS L3 resources may be assigned as cell-specific measurements and may be periodically configured. As noted, in certain cases, the serving cell and neighbor cells may transmit on the same frequency or range of frequencies (e.g., intra-frequency transmissions). If a CSI-RS is deemed as intra-frequency, the UE can measure the CSI-RS without opening a measurement gap (MG). CSI-RS intra-frequency measurements can involve many resources from many cells, for example, up to 32 CSI-RSs transmitted by up to eight intra-frequency neighbor cells.

Figure 4A:
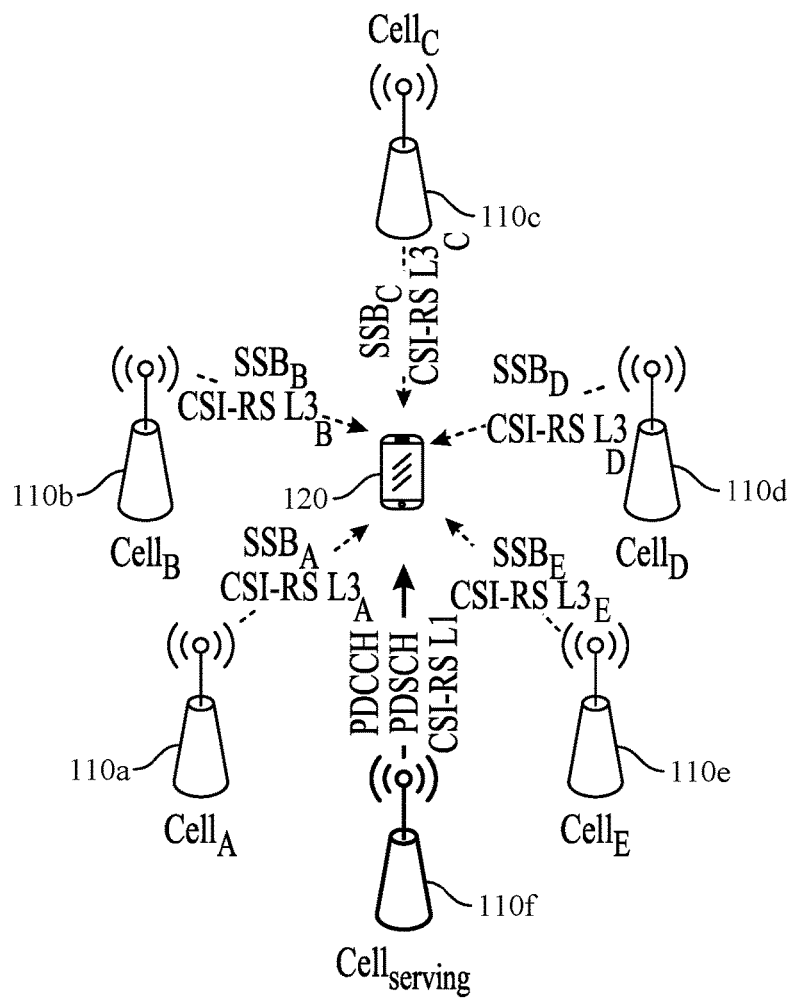
FIG. 4A is a diagram illustrating an example UE communicating with multiple cells, including a serving cell and neighbor cells, in accordance with certain aspects of the present disclosure.

In a multi-cell deployment, a UE communicates with a serving cell and monitors one or more neighbor cells. For example, FIG. 4A is a diagram illustrating an example UE 120 communicating with multiple cells 110*a-f*, including a serving cell 110*f* and neighbor cells 110*a-e*. In this example, the UE 120 may monitor CSI-RSs and associated SSBs from neighbor cells 110*a-e*, and the UE 120 may receive transmissions from a serving cell 110*f*. For example in 5G NR, the serving cell 110*f* may transmit wideband channels PDCCH/PDSCH and/or CSI-RS for Layer 1 (L1) measurements (such as channel quality indicator (CQI) or a reference signal received power (RSRP)). An SSB may be QCLed with a CSI-RS for L3 and used for detecting the neighbor cell and timing. For example, the $SSB_A$ is QCLed with CSI-RS $L3_A$, which are transmitted by the neighbor cell 110*a*, the $SSB_B$ is QCLed with CSI-RS $L3_B$, which are transmitted by the neighbor cell 110*b*, the $SSB_C$ is QCLed with CSI-RS $L3_C$, which are transmitted by the neighbor cell 110*c*, the $SSB_D$ is QCLed with CSI-RS $L3_D$, which are transmitted by the neighbor cell 110*d*, and the $SSB_E$ is QCLed with CSI-RS $L3_E$, which are transmitted by the neighbor cell 110*e*.

Figure 4B:
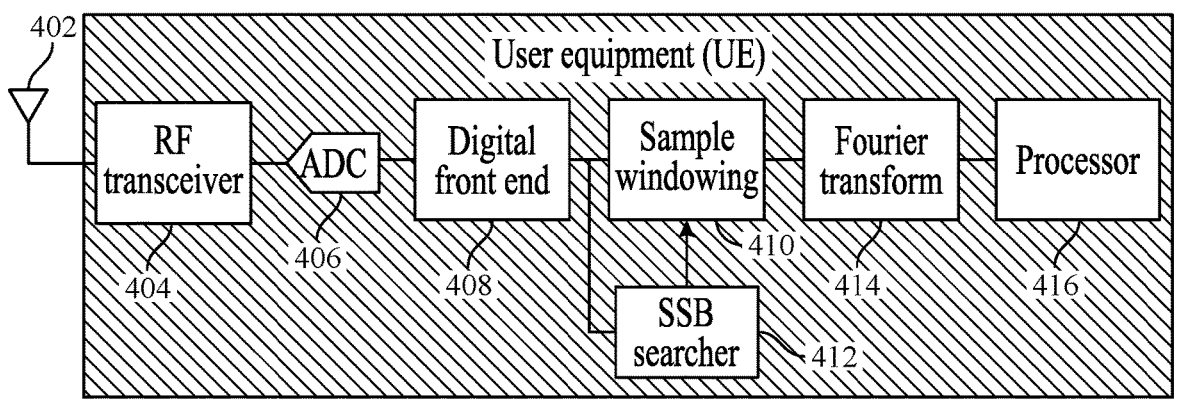
FIG. 4B is a block diagram of an example low complexity UE architecture along a receive path, in accordance with certain aspects of the present disclosure.

Certain UEs may share certain processing resources (e.g., a sampling window, synchronization searcher, and a processor) for processing signals from the serving cell and the neighbor cell. In Release 16 5G NR, for example, a UE may use a single FFT for multiple cell measurements per frequency layer for intra-frequency measurements of CSI-RS L3. In some cases, UEs that share processing resources may have a generalized low complexity architecture (e.g., machine-type communication (MTC) devices or Internet-of-Things (IoT) devices, which may be narrowband IoT (NB-IoT) devices). FIG. 4B is a block diagram of an example low complexity UE architecture 400 along a receive path, in accordance with certain aspects of the present disclosure. As shown, the UE architecture 400 includes an antenna 402, a radio frequency (RF) transceiver 404, an analog-to-digital converter (ADC) 406, a digital front end 408, a sampling window 410, an SSB searcher 412, a Fourier transform module 414, and a processor 416.

RF signals received by the antenna 402 may be amplified and filtered with the RF transceiver 404. In certain cases, the RF transceiver 404 may convert (e.g., downconvert) the received signals to a baseband frequency using a mixer and frequency synthesizer. The ADC 406 may convert the analog signals to digital signals (e.g., in-phase (I) and quadrature (Q) digital signals) for digital processing. The digital front end 408 may perform digital down-sampling and/or channel filtering of the digital signals. The sampling window 410 may extract a portion of the digital signals for further digital processing. For example, the sampling window 410 may multiply the digital input with a rectangular window function. The SSB searcher 412 may determine the boundaries of the window function (such as a symbol boundary) for the sampling window 410 based on the timing obtained from an SSB, which may be from the serving cell or a neighbor cell. In some cases, the SSB signal may be handled separately by the SSB searcher 412. As an example, due to a cyclic prefix (CP) being at beginning portion and a copy of a sequence of data at the end portion of an OFDM symbol, there is a high correlation between the CP and the end portion of the symbol compared to other portions of the symbol. In certain cases, the SSB may be used in determining the timing boundaries (e.g., phase offsets) and/or frequency offsets. The Fourier transform module 414 may convert the samples from the sampling window 410 to the frequency domain, for example, using a Discrete Fourier Transform (DFT).

The processor 416 may be a digital signal processor (DSP), for example. In certain cases, the sampling window 410, SSB searcher 412, and the Fourier transform module 414 may be integrated with the processor 416. The processor 416 may process the serving cell signals and the neighbor cell signals in the frequency domain and/or time domain. The processor 416 may measure the CSI-RSs from the neighbor cells. For example, the serving cell signals (e.g., PDSCH/PDCCH/CSI-RS for L1) and the neighbor cell CSI-RS signal for L3 may be processed from the same sampling window 410 by the same processor 416. That is, the UE may use the same signal processing path as the serving cell channels/signals for intra-frequency CSI-RS measurements for neighbor cells. Expressed another way, the neighbor cell measurements may share a majority of the data path with serving cell signals, for example, with regard to the sample windowing 410 and Fourier Transform module 414.

As noted, in communication systems (e.g., Release 16 5G NR) where the UE is configured (e.g., by the network) to perform a gapless intra-frequency CSI-RS L3 measurement (e.g., without the use of measurement gaps), the UE may be configured to follow the serving cell timing for processing both serving cell data traffic and the measurement on CSI-RS L3 resources, for both the serving and neighboring cells. Additionally, due in part to following the serving cell timing, the network may not enable or support a restriction in the downlink scheduling.

In these situations (e.g., when the UE shares processing resources and follows the serving cell timing), the neighbor cell CSI-RS L3 measurement quality may be undesirable or degrade if (i) any DL slot contains both serving cell traffic and a neighbor cell CSI-RS L3 resource to measure and (ii)

there is a large timing difference (or timing offset) (e.g., above a threshold timing difference) between the serving cell and the neighbor cell.

Figure 5:
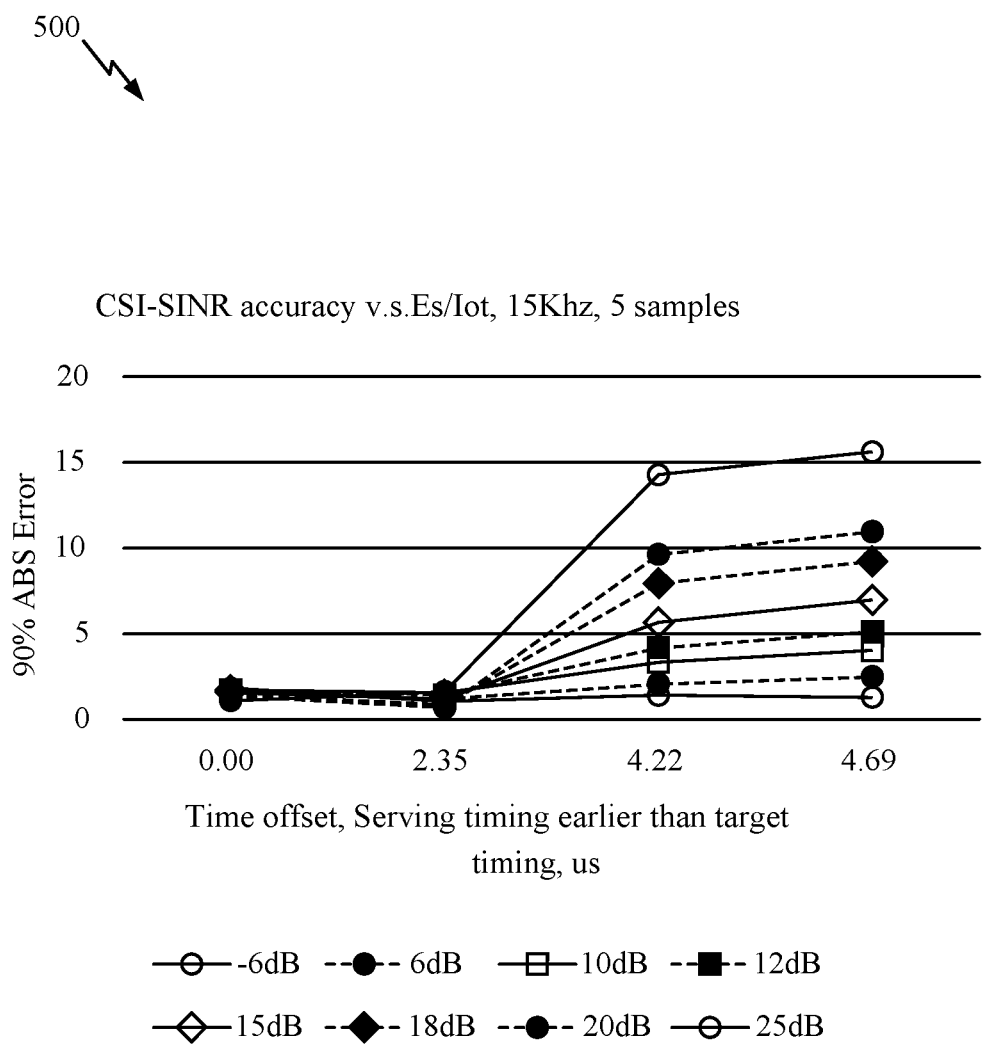
FIG. 5 is a graph of channel state information signal to interference plus noise ratio (CSI-SINR) versus time offset, in accordance with certain aspects of the present disclosure.

The UE may rely on the serving cell timing to program the sample windowing 410 and Fourier transform module 414. In such a case, the processor 416 may be unable to measure the CSI-RSs from the neighbor cells, or the measurements may be degraded due to the timing offset from the serving cell. For example, one or more CSI-RS L3 measurements, including, but not limited to, channel state information reference signal received power (CSI-RSRP), channel state information reference signal received quality (CSI-RSRQ), channel state information signal to interference plus noise ratio (CSI-SINR), etc., may be subject to degradation in the measurement accuracy when the serving cell timing is offset from the neighbor cell timing, for example, beyond half of a CP of a symbol. FIG. 5 is a graph 500 illustrating the measurement accuracy in CSI-SINR as the time offset between the serving cell and target cell increases, in accordance with certain aspects of the present disclosure. On the other hand, if the sampling window is configured with the timing of the neighbor cell, the serving cell's PDSCH channel performance may suffer instead.

In some cases, in communication systems in which the UE may be expected to share processing resources for intra-frequency CSI-RS L3 measurements, the communication systems may limit the CSI-RS L3 measurements to resources in which the timing cell offset between the serving cell and neighbor cell is below a predetermined threshold (e.g., below half of a CP of a symbol). However, limiting the CSI-RS L3 measurements in this manner can impact (e.g., reduce) the UE performance for CSI-RS based RRM and/or mobility control.

Accordingly, it may be desirable to provide technique and apparatus for improving the accuracy of intra-frequency CSI-RS L3 measurements.

Example Intra-Frequency Measurement of L3-Based CSI-RSs

Aspects of the present disclosure provide techniques and apparatus for enhanced intra-frequency measurements of L3 CSI-RSs. In some aspects, the UE may be configured to determine a UE capability associated with intra-frequency L3 CSI-RS measurement. For example, the UE can determine whether it has a capability to perform intra-frequency L3 CSI-RS measurement without sharing certain processing resources (e.g., FFT, same sampling window, etc.). The UE may then perform an intra-frequency CSI-RS L3 measurement procedure, based in part on the UE capability.

When the UE has the capability to perform intra-frequency L3 CSI-RS measurement without sharing certain processing resources (e.g., the UE may be configured with multiple FFTs, each with a different sampling window), the UE may perform an intra-frequency measurement of L3 CSI-RS from a target cell and receive downlink data traffic (or process downlink data traffic received) from a serving cell at the same time (e.g., during a same OFDM symbol). Doing so can avoid (or mitigate) the degradation in measurement accuracy associated with sharing certain processing resources, such as a single FFT, when performing intra-frequency CSI-RS L3 measurement with a large time offset between serving and neighboring cells.

On the other hand, when the UE does not have the capability to perform intra-frequency L3 CSI-RS measurement without sharing certain processing resources, the serving cell may configure a downlink scheduling restriction on one or more resources that (at least partially) overlap the CSI-RS L3 resources. For example, the serving cell may blank the one or more resources that (at least partially) overlap the CSI-RS L3 resources. The UE may perform an intra-frequency measurement of L3 CSI-RS on the blanked resources. Doing so enables the UE to prioritize the intra-frequency CSI-RS L3 measurement in scenarios where the UE has to share certain processing resources.

Figure 6:
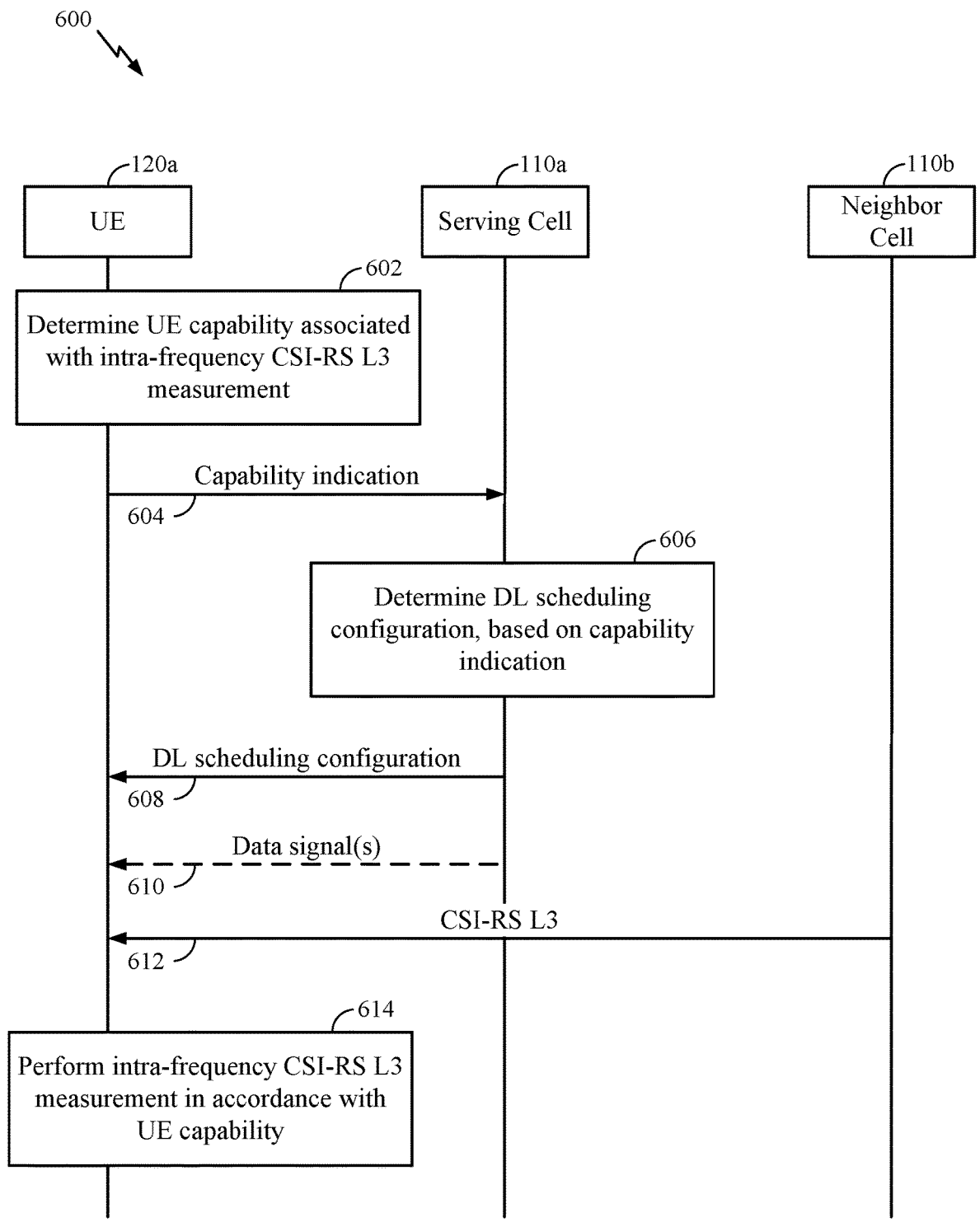
FIG. 6 is a call flow diagram illustrating example signaling for enhanced intra-frequency measurement of CSI-RS L3, in accordance with certain aspects of the present disclosure.

FIG. 6 is a signaling flow of example operations 600 for improving the accuracy of intra-frequency CSI-RS L3 measurement, in accordance with certain aspects of the present disclosure. As shown, the UE 120a determines a UE capability associated with intra-frequency CSI-RS L3 measurement (step 602). In some cases, the UE 120a may a priori know its UE capability associated with intra-frequency CSI-RS L3 measurement at step 602. For example, the UE may have a preset (or preconfigured) UE capability report indicating its capability associated with intra-frequency CSI-RS L3 measurement. The UE capability may include a capability of the UE to simultaneously process (e.g., receive) downlink data from a serving cell and process measurements of a CSI-RS L3 from a target cell, for example, on one or more resources in which the downlink data and CSI-RS L3 overlap.

For example, in contrast to the low complexity UE architecture 400 illustrated in FIG. 4B, certain UEs may have an enhanced UE architecture with a dedicated measurement engine for CSI-RS L3. The dedicated measurement engine, for example, may include at least one of an SSB searcher (e.g., an additional SSB searcher similar to SSB searcher 412), a sample windowing (or sample window) (e.g., an additional sample windowing similar to sample windowing 410), a Fourier transform (FFT) (e.g., an additional Fourier transform similar to Fourier transform 414), or a processor (e.g., an additional processor similar to processor 416). In some aspects, the dedicated measurement engine may be included as part of a single processor that includes the dedicated measurement engine and a data processing engine.

On the other hand, the UE may determine that the UE does not have a capability to simultaneously receive downlink data from the serving cell and process measurements of CSI-RS L3 from a target cell. For example, the UE may have to share certain processing resources (e.g., FFT, sampling window). In some cases, the UE may a low complexity architecture (e.g., similar to the low complexity UE architecture 400) and may share processing resources within the low complexity architecture.

The dedicated measurement engine may enable the UE to perform multiple simultaneous receiver (Rx) FFT operations. For example, the UE can use (i) a data processing engine (e.g., processor 416) to process downlink data received from the serving cell, based on a Fourier transform (e.g., FFT). The Fourier transform may be configured to use a sampling window (e.g., sampling window configured based on the serving cell timing).

As shown in FIG. 6, the UE transmits an indication of the UE capability to the serving cell (e.g., a base station, such as a gNB, in the serving cell) (step 604). The serving cell determines a DL scheduling configuration, based on the capability indication (step 606). The serving cell transmits the DL scheduling configuration to the UE (step 608). In some aspects, the network may determine whether to restrict the DL scheduling (e.g., by enabling a blanking of one or more symbols that overlap the CSI-RS L3 resource symbols), based on the capability indication.

For example, the network may determine to disable blanking of a set of symbols (e.g., PDSCH symbols) that at least partially overlap the CSI-RS L3 resource symbols, when the capability indication indicates that the UE does have a capability to simultaneously receive downlink data from the serving cell and measure CSI-RS L3 from a target cell. In this example, the DL scheduling configuration may include an indication that blanking is disabled for the scheduled PDSCH symbols.

In another example, the network may determine to enable blanking of a set of symbols (e.g., PDSCH symbols) that at least partially overlap the CSI-RS L3 resource symbols, when the capability indication indicates that the UE does not have a capability to simultaneously receive downlink data from the serving cell and measure CSI-RS L3 from a target cell. Stated differently, the network may restrict DL scheduling on the relevant symbols that include the CSI-RS L3 intra-frequency resources. In this example, the DL scheduling configuration may include an indication of a set of scheduled PDSCH symbols in which blanking is enabled.

In some aspects, the network may disable blanking of a set of symbols if the UE indicates that it lacks the capability to prioritize the CSI-RS intra-frequency measurement over the serving cell DL channels.

As shown in FIG. 6, the UE receives a CSI-RS L3 from the neighbor cell (or target cell) 110b (step 612) and performs intra-frequency CSI-RS L3 measurement in accordance with the UE capability (step 614). For example, when the UE has a capability to perform intra-frequency CSI-RS L3 measurement without sharing certain processing resources, the UE may simultaneously receive downlink data from the serving cell (e.g., in step 610) and measure CSI-RS L3 from a target cell (e.g., in step 612) during a same symbol. In one aspect, the UE may use an enhanced UE architecture (described above) with a dedicated measurement engine for the measurement of the CSI-RS L3 resources. The dedicated measurement engine may be separate from a data processing engine used to process data received from a serving cell.

The enhanced UE architecture can resolve the conflict of the FFT window timings, when the CSI-RS L3 intra-frequency resource symbol is overlapped with the PDSCH symbols (and the bandwidth of the CSI-RS L3 resource is within the active BWP of the serving cell). For example, the dedicated measurement engine (along with the data processing engine) can enable the UE to perform multiple simultaneous receive (Rx) FFT operations (e.g., during the same symbol). For instance, the Fourier transform for the data processing engine can use a sampling window programmed (or configured) based on the serving cell timing and the Fourier transform for the dedicated measurement engine can use a different sampling window programmed (or configured) based on the target cell timing.

In another example, when the UE does not have a capability to perform intra-frequency CSI-RS L3 measurement without sharing certain processing resources, the UE may not be able to simultaneously receive downlink data from the serving cell and process measurements of CSI-RS L3 from a target cell. In this case, aspects may support another UE capability for prioritizing the CSI-RS intra-frequency measurement over the serving cell DL channels. For example, the UE may perform the intra-frequency CSI-RS L3 measurement on the blanked PDSCH symbols (indicated in the DL scheduling configuration from the serving cell). The blanked PDSCH symbols can include DL symbols, UL symbols, guard symbols, or a combination thereof.

In one aspect, the network may enable the DL scheduling restriction on the consecutive configured CSI-RS L3 symbol, on one or more symbols before the CSI-RS L3 symbol, and on one or more symbols after the CSI-RS L3 symbol. As used herein, restricting DL scheduling (or a DL scheduling restriction) may refer to refraining from scheduling and transmitting DL PDSCH for a UE over certain symbols. The symbol(s) before the CSI-RS L3 symbol and the symbol(s) after the CSI-RS L3 symbol may be guard symbols. In some cases, the network may enable the DL scheduling restriction by blanking the set of resources. As used herein, blanking of resources may refer to a network entity (e.g., a serving cell) refraining from transmitting at certain time-domain resources (e.g., symbols, slots, subframes, etc.) and at certain frequency-domain resources (e.g., the same frequencies as the CSI-RS resources of a neighbor cell such as a bandwidth part of the CSI-RS resources). When blanking resources, the serving cell may skip transmitting certain resources over which one or more resources of neighbor cells are shared between the serving cell and neighbor cells. For example, when blanking resources, the serving cell may skip transmitting certain resources that overlap with or are adjacent to reference signal resources of neighbor cells.

In some aspects, the UE may use the blanked PDSCH symbols to change the Rx FFT timing accordingly to ensure that the precise timing is used for processing the CSI-RS L3 resources. For example, during a first set of the blanked PDSCH symbols, the UE may (re)configure the FFT timing from the serving cell timing to the target cell timing. That is, the UE may (re)configure (or reprogram) the sampling window (e.g., sampling window 410) for a Fourier transform (e.g., Fourier transform 414), based on the target cell timing. In some cases, the first set of the blanked PDSCH symbols may include guard symbol(s) that are prior to the configured CSI-RS L3 symbol.

During a second set of the blanked PDSCH symbols, the UE may perform the intra-frequency CSI-RS L3 measurement using the reconfigured FFT timing. For example, the second set of the blanked PDSCH symbols may include the configured CSI-RS L3 resource (e.g., the second set of blanked PDSCH symbols may overlap the configured CSI-RS L3 symbol).

During a third set of the blanked PDSCH symbols, the UE may (re)configure the FFT timing from the target cell timing back to the serving cell timing. That is, the UE may (re)configure (or reprogram) the sampling window (e.g., sampling window 410) for a Fourier transform (e.g., Fourier transform 414), based on the serving cell timing. In some cases, the third set of the blanked PDSCH symbols may include guard symbol(s) that are after the configured CSI-RS L3 symbol.

Figure 7:
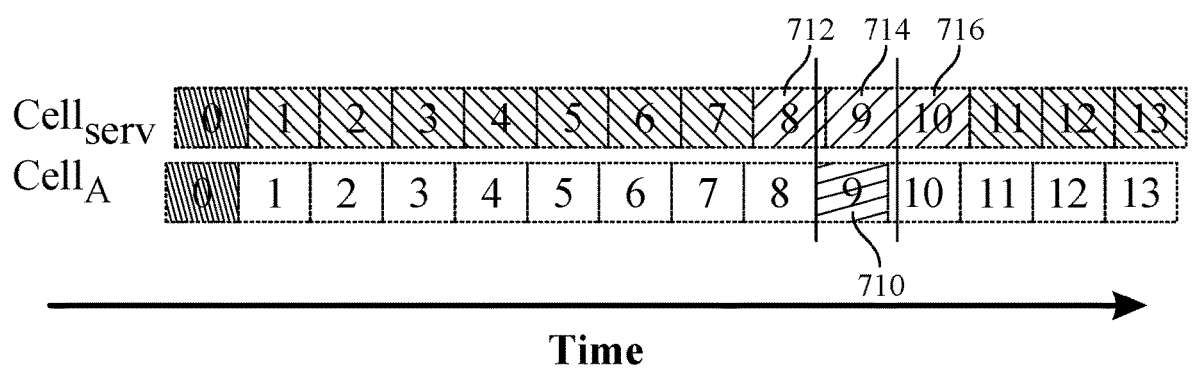
FIG. 7 is a diagram of an example of blanking resources of a serving cell in a slot when the timing of the serving cell and the timing of the neighbor cell are offset, in accordance with certain aspects of the present disclosure.

FIG. 7 is a diagram of an example of blanking resources of a serving cell in a slot when the slot boundaries of the serving cell and the neighbor cell are offset (e.g., there is a timing offset between the serving cell and the neighbor cell), in accordance with certain aspects of the present disclosure. In this example, the serving cell may determine that the configured CSI-RS L3 resource (from the target cell) is symbol 710. For example, the CSI-RS L3 resource information may be exchanged and coordinated between gNB(s) of the serving cell and neighboring cell(s). The serving cell (e.g., Cell$_{Serv}$) may identify one or more resources, which overlap with or are adjacent to the symbol 710, in which to blank. Here, for example, the serving cell may identify symbols 712, 714, and 716 as a set of resources (within the serving cell) to blank. That is, the serving cell may restrict symbols 712, 714, and 716 from DL scheduling in order to allow the UE to measure the CSI-RS L3 on symbol 710 (e.g., target resource) for a neighbor cell (e.g., Cell$_A$). As noted above, the serving cell may enable blanking on a set of resources in response to receiving an indication from the UE that the UE lacks capability to simultaneously receive downlink data from the serving cell and process intra-frequency measurements of CSI-RS L3 (e.g., in the same symbol).

In this particular example, during symbol 712, the UE may reconfigure the sampling window (e.g., sampling window 410) from the serving cell timing to the target cell timing. During symbol 714, the UE may measure the CSI-RS L3 resource (e.g., in symbol 710) from the target cell, using at least the reconfigured sampling window. During symbol 716, the UE may reconfigure the sampling window from the target cell timing to the serving cell timing.

Note that while the aspects described herein use a UE performing intra-frequency measurement of CSI-RS L3 from a single neighbor (target) cell, aspects described herein are not limited to such and can be used for intra-frequency measurement of CSI-RS L3 from multiple neighbor cells. In some cases, for example, there may be multiple different neighbor cells in the same frequency layer. In these situations, it is possible that there can be a different timing offset between each neighbor cell and the serving cell. Consequently, the UE may have to use a different sampling window (e.g., sampling window 410) for the Fourier transform (e.g., Fourier transform 414), for each of the neighbor cells.

Accordingly, in some aspects, when the communication system supports CSI-RS L3 resources for multiple neighbor cells on the same frequency layer, the serving cell may allocate multiple guard symbols (e.g., at least two guard symbols) between the resources from any two neighbor cells. In this manner, aspects may ensure that the CSI-RS L3 resources from cells with a large time offset are non-contiguous in time to allow UEs (having the capability to prioritize intra-frequency CSI-RS L3 measurement) sufficient time to reprogram/switch the FFT window for measuring a different cell.

Figure 8:
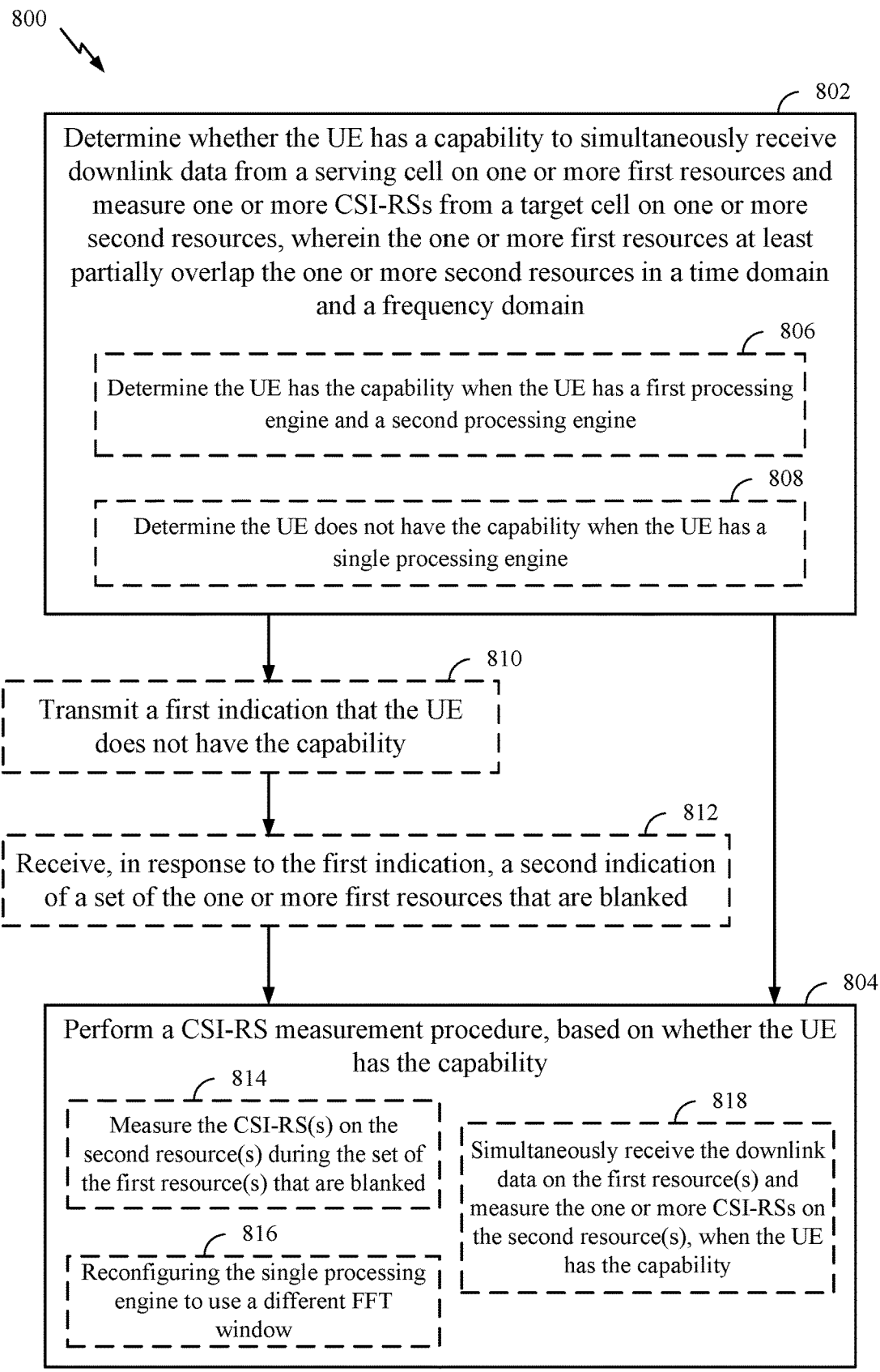
FIG. 8 is a flow diagram illustrating example operations for wireless communication by a UE, in accordance with certain aspects of the present disclosure.

FIG. 8 is a flow diagram illustrating example operations 800 for wireless communication, in accordance with certain aspects of the present disclosure. The operations 800 may be performed, for example, by a UE (e.g., such as the UE 120a in the wireless communication network 100). The operations 800 may be implemented as software components that are executed and run on one or more processors (e.g., controller/processor 280 of FIG. 2). Further, the transmission and reception of signals by the UE in operations 800 may be enabled, for example, by one or more antennas (e.g., antennas 252 of FIG. 2). In certain aspects, the transmission and/or reception of signals by the UE may be implemented via a bus interface of one or more processors (e.g., controller/processor 280) obtaining and/or outputting signals.

The operations 800 may begin, at block 802, where the UE determines whether the UE has a capability to simultaneously receive downlink data from a serving cell on one or more first resources and measure one or more CSI-RSs (e.g., CSI-RSs L3) from a target cell on one or more second resources. The one or more first resources at least partially overlap the one or more second resources in a time domain and a frequency domain. For example, the one or more first resources may include a set of PDSCH symbols and the one or more second resources may include a set of CSI-RS L3 resource symbols. In this example, the bandwidth of the CSI-RS L3 resource may be within the active BWP of the serving cell and the CSI-RS L3 resource symbols may be (at least partially) overlapped with the PDSCH symbols.

In some aspects, the UE may determine it has the capability to simultaneously receive downlink data from the serving cell and measure CSI-RS(s) from the target cell (block 806). For example, the UE may have the capability when the UE has an enhanced UE architecture. As noted, in this enhanced UE architecture, the UE may include (i) a first processing engine (e.g., data processing engine) configured to process the downlink data received on the one or more first resources and (ii) a second processing engine (e.g., dedicated measurement engine) configured to process measurements of CSI-RSs on the one or more second resources (block 806). The first processing engine may be configured to perform a first Rx FFT operation and the second processing engine may be configured to perform a second Rx FFT operation. The first Rx FFT operation may use a first FFT window (e.g., sampling window 410) based on a first timing of the serving cell. The second Rx FFT operation may use a second FFT window (e.g., another sampling window 410) based on a second timing of the target cell.

Alternatively, in some aspects, the UE may determine it does not have the capability to simultaneously receive downlink data from the serving cell and measure CSI-RS(s) from the target cell (block 808). For example, the UE may not have the capability when the UE has a low complexity UE architecture (e.g., low complexity UE architecture 400). As noted, in this low complexity UE architecture the UE may include a single processing engine configured to process the downlink data and measure the one or more CSI-RSs (block 808). The single processing engine may be configured to use a FFT window (e.g., sampling window 410) based on a first timing of the serving cell.

At block 804, the UE performs a CSI-RS measurement procedure, based on whether the UE has the capability. The CSI-RS measurement procedure may be an intra-frequency CSI-RS L3 measurement procedure. In some aspects, performing the CSI-RS measurement procedure may include simultaneously receiving the downlink data on the one or more first resources and measuring the one or more CSI-RSs on the one or more second resources, when the UE has the capability (block 818). In some aspects, simultaneously receiving the downlink data and measuring the one or more CSI-RSs may include receiving the downlink data and measuring the one or more CSI-RSs during a same OFDM symbol.

In some aspects, the operations 800 may further include transmitting, by the UE to a base station in the serving cell, a (first) indication that the UE does not have the capability, e.g., upon determining that the UE does not have the capability (block 810). In these aspects, the operations 800 may further include receiving, in response to the indication, another (second) indication of a set of the one or more first resources that are blanked from a base station (block 812). In these aspects, performing the CSI-RS measurement procedure may include measuring the one or more CSI-RSs on the one or more second resources during the set of the one or more first resources (that are blanked) (block 814). For example, the UE may reconfigure the single processing engine to use another FFT window based on a second timing of the target cell during the set of the one or more first resources (block 816).

Figure 9:
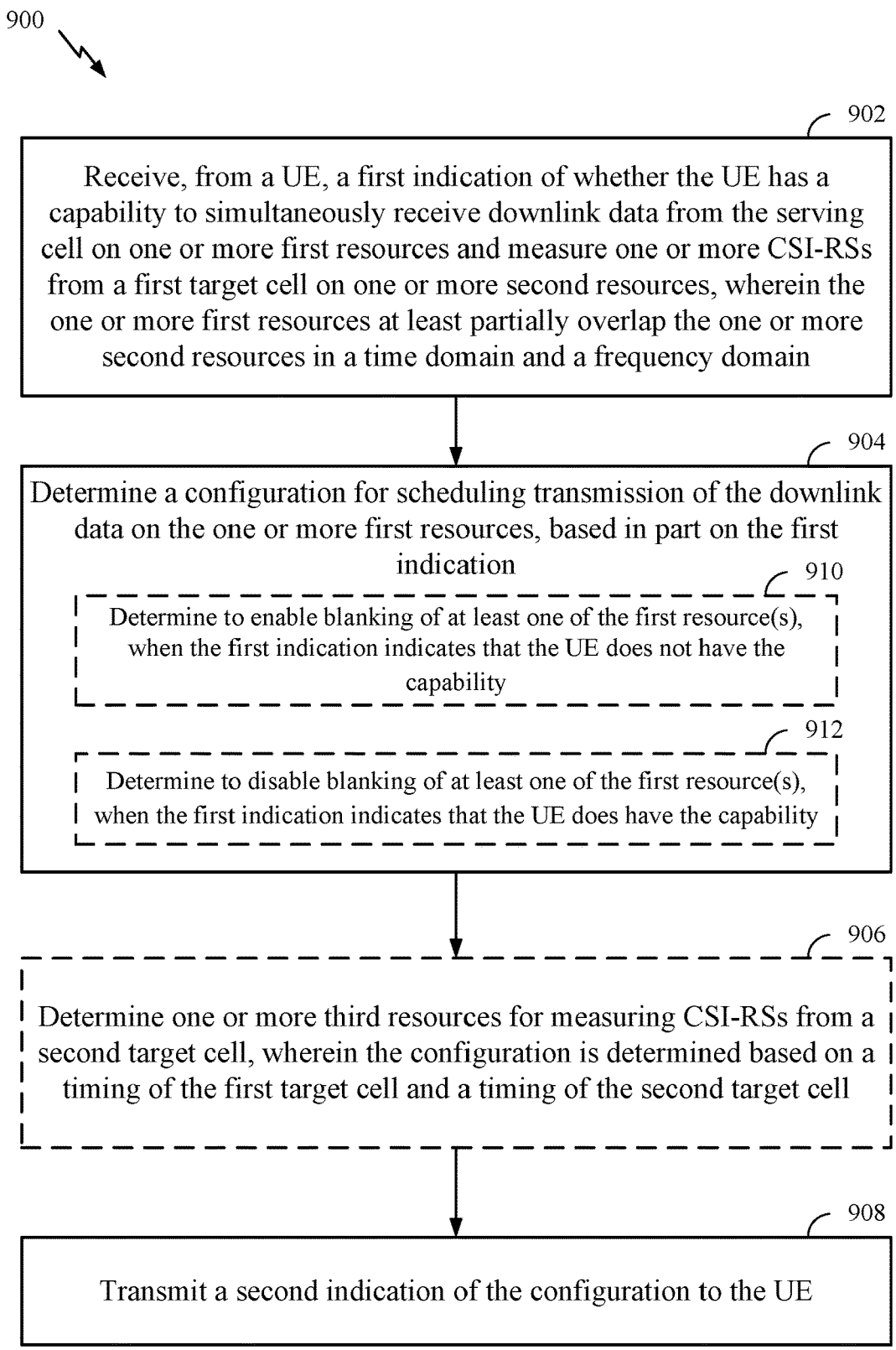
FIG. 9 is a flow diagram illustrating example operations for wireless communication by a BS, in accordance with certain aspects of the present disclosure.

FIG. 9 is a flow diagram illustrating example operations 900 for wireless communication, in accordance with certain aspects of the present disclosure. The operations 900 may be performed, for example, by a BS (e.g., such as the BS 110a in the wireless communication network 100). The operations 900 may be complementary to certain operations described herein that are performed by the UE. The operations 900 may be implemented as software components that are executed and run on one or more processors (e.g., controller/processor 240 of FIG. 2). Further, the transmission and reception of signals by the BS in operations 900 may be enabled, for example, by one or more antennas (e.g., antennas 234 of FIG. 2). In certain aspects, the transmission and/or reception of signals by the BS may be implemented via a bus interface of one or more processors (e.g., controller/processor 240) obtaining and/or outputting signals.

The operations 900 may begin, at block 902, where the BS receives, from a UE (e.g., UE 120*a*), a first indication of whether the UE has a capability to simultaneously receive downlink data from the serving cell on one or more first resources and measure one or more CSI-RSs from a (first) target cell on one or more second resources. The one or more first resources may at least partially overlap the one or more second resources in a time domain and a frequency domain. For example, the one or more first resources may include a set of PDSCH symbols and the one or more second resources may include a set of CSI-RS L3 resource symbols. In this example, the bandwidth of the CSI-RS L3 resource may be within the active BWP of the serving cell and the CSI-RS L3 resource symbols may be overlapped with the PDSCH symbols.

At block 904, the BS determines a configuration for scheduling transmission of the downlink data on the one or more first resources, based in part on the first indication. At block 908, the BS transmits a second indication of the configuration to the UE.

In some aspects, determining the configuration for scheduling transmission of the downlink data (at block 904) may include determining whether to enable a blanking of at least one of the one or more first resources, based in part on the first indication.

For example, when the first indication indicates that the UE does not have the capability, determining the configuration for scheduling transmission of the downlink data may include determining to enable the blanking of the at least one of the one or more first resources, where the configuration includes an indication of the at least one of the one or more first resources that is blanked (block 910). In some aspects, a number of the at least one of the one or more first resources that is blanked may be based on a timing of the serving cell and a timing of the (first) target cell. For example, a larger number of the first resources may be blanked for larger time offsets (e.g., above a threshold), whereas a smaller number of the first resources may be blanked for smaller time offsets (e.g., below a threshold).

In some aspects, the at least one of the one or more first resources may include a first OFDM symbol (e.g., symbol 714) that overlaps with at least one OFDM symbol (e.g., symbol 710) of the one or more second resources configured for measuring a CSI-RS. In these aspects, the at least one of the one or more first resources may further include (i) at least one second OFDM symbol (e.g., symbol 712) that is adjacent to and prior to the first OFDM symbol and (ii) at least one third OFDM symbol (e.g., symbol 716) that is adjacent to and after the first OFDM symbol. In some cases, the at least one second OFDM symbol and the at least one third OFDM symbol may be guard symbols.

In another example, when the first indication indicates that the UE does have the capability, determining the configuration for scheduling transmission of the downlink data may include determining to disable the blanking of the at least one of the one or more first resources, where the configuration indicates that the blanking is disabled (block 912).

In some aspects, the operations 900 may further include determining, by the BS, one or more third resources for measuring CSI-RSs from another (second) target cell (block 906). In these aspects, the configuration may be further determined based in part on a timing of the first target cell and a timing of the second target cell. The configuration may include an indication of a number of guard symbols between the one or more second resources and the one or more third resources.

Figure 10:
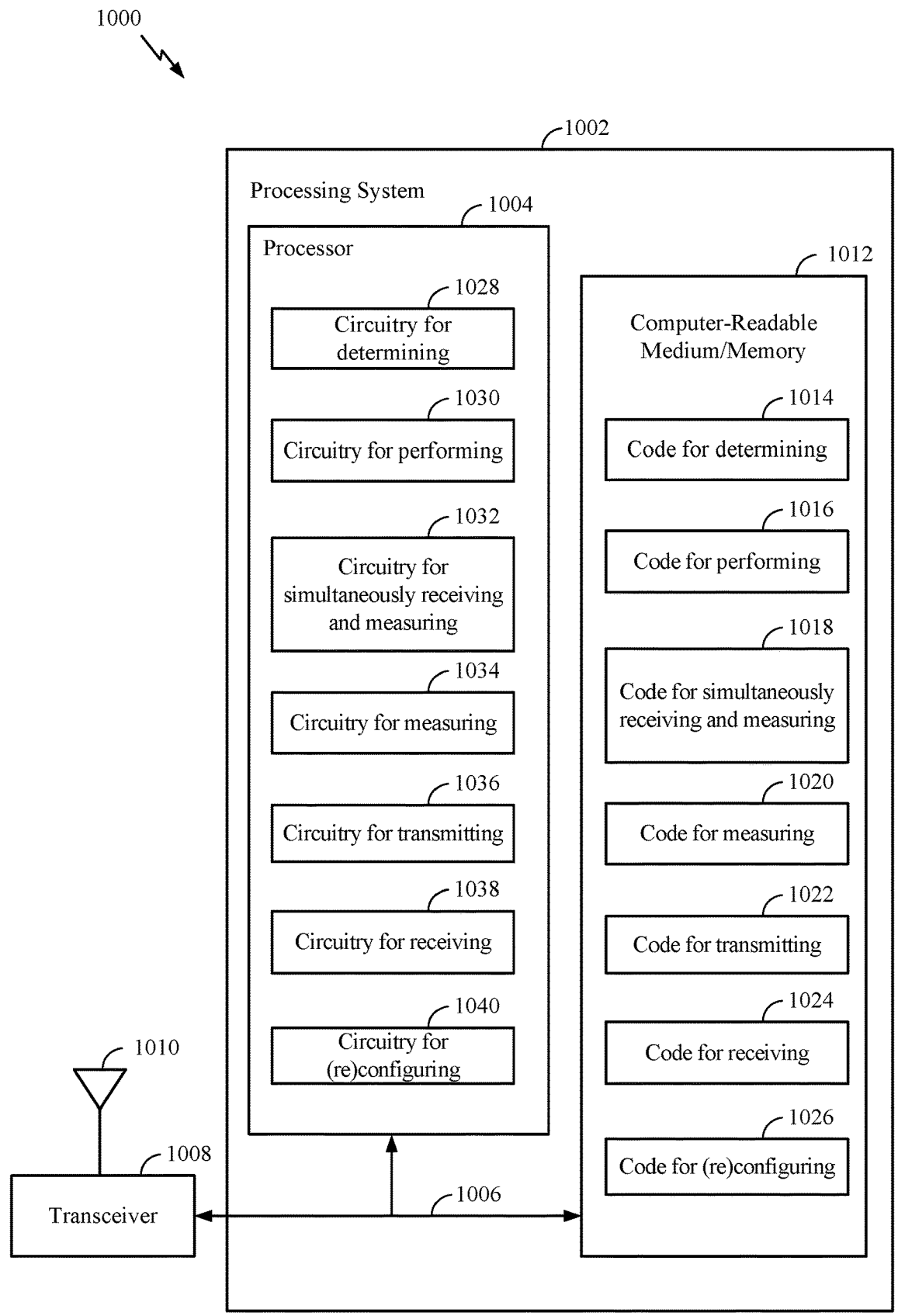
FIG. 10 illustrates a communications device that may include various components configured to perform operations for the techniques disclosed herein in accordance with aspects of the present disclosure.

FIG. 10 illustrates a communications device 1000 that may include various components (e.g., corresponding to means-plus-function components) configured to perform operations for the techniques disclosed herein, such as the operations illustrated in FIG. 8. The communications device 1000 includes a processing system 1002 coupled to a transceiver 1008 (e.g., a transmitter and/or a receiver). The transceiver 1008 is configured to transmit and receive signals for the communications device 1000 via an antenna 1010, such as the various signals as described herein. The processing system 1002 may be configured to perform processing functions for the communications device 1000, including processing signals received and/or to be transmitted by the communications device 1000.

The processing system 1002 includes a processor 1004 coupled to a computer-readable medium/memory 1012 via a bus 1006. In certain aspects, the computer-readable medium/memory 1012 is configured to store instructions (e.g., computer-executable code) that when executed by the processor 1004, cause the processor 1004 to perform the operations illustrated in FIG. 8, or other operations for performing the various techniques discussed herein for enhanced intra-frequency CSI-RS L3 measurement. In certain aspects, computer-readable medium/memory 1012 stores code 1014 for determining; code 1016 for performing; code 1018 for simultaneously receiving and measuring; code 1020 for measuring; code 1022 for transmitting; code 1024 for receiving; code 1026 for (re)configuring, etc. In certain aspects, the processor 1004 has circuitry configured to implement the code stored in the computer-readable medium/memory 1012. The processor 1004 includes circuitry 1028 for determining; circuitry 1030 for performing; circuitry 1032 for simultaneously receiving and measuring; circuitry 1034 for measuring; circuitry 1036 for transmitting; circuitry 1038 for receiving; circuitry 1040 for (re)configuring, etc.

Figure 11:
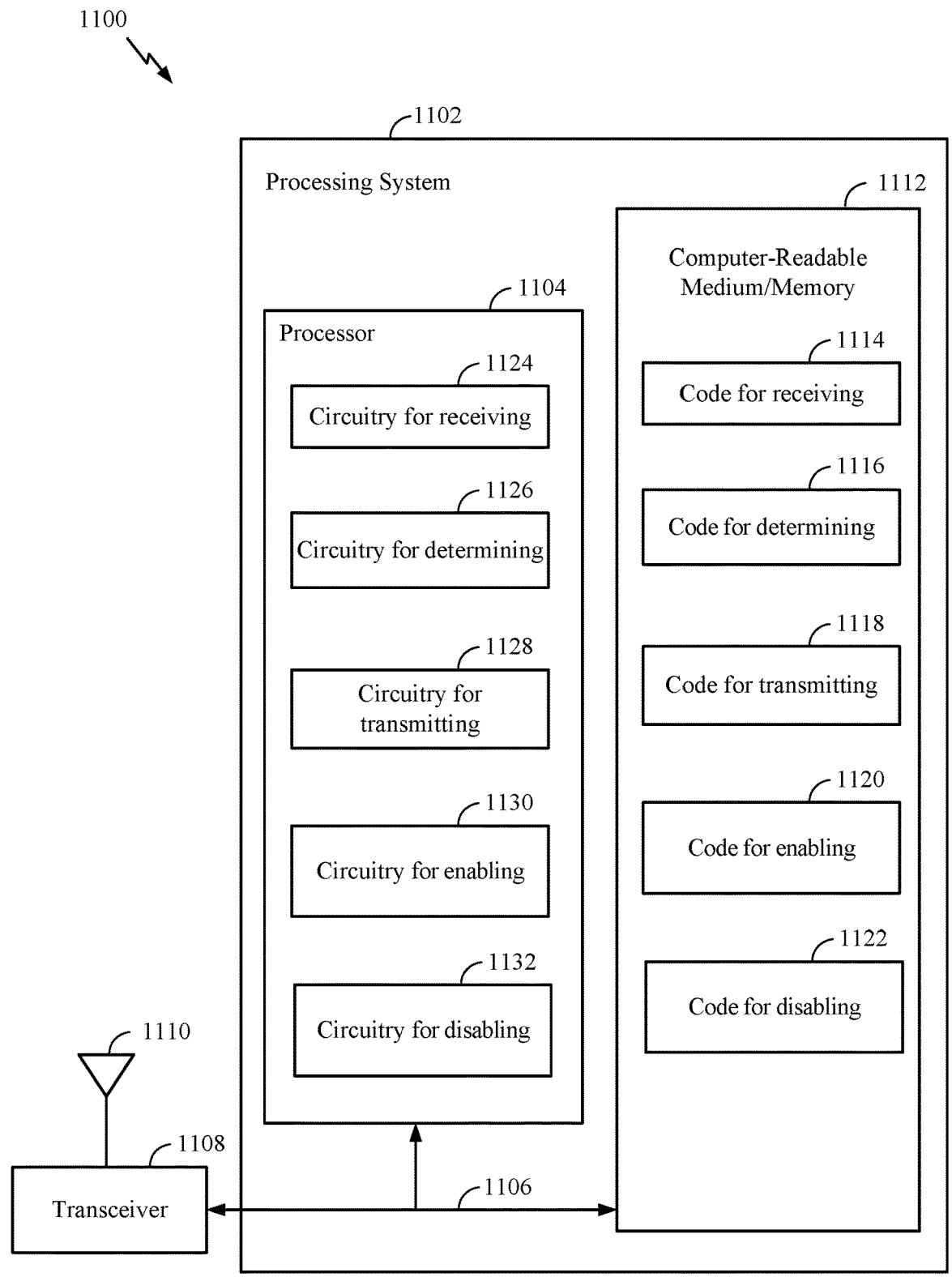
FIG. 11 illustrates a communications device that may include various components configured to perform operations for the techniques disclosed herein in accordance with aspects of the present disclosure.

FIG. 11 illustrates a communications device 1100 that may include various components (e.g., corresponding to means-plus-function components) configured to perform operations for the techniques disclosed herein, such as the operations illustrated in FIG. 9. The communications device 1100 includes a processing system 1102 coupled to a transceiver 1108 (e.g., a transmitter and/or a receiver). The transceiver 1108 is configured to transmit and receive signals for the communications device 1100 via an antenna 1110, such as the various signals as described herein. The processing system 1102 may be configured to perform processing functions for the communications device 1100, including processing signals received and/or to be transmitted by the communications device 1100.

The processing system 1102 includes a processor 1104 coupled to a computer-readable medium/memory 1112 via a bus 1106. In certain aspects, the computer-readable medium/memory 1112 is configured to store instructions (e.g., computer-executable code) that when executed by the processor 1104, cause the processor 1104 to perform the operations illustrated in FIG. 9, or other operations for performing the various techniques discussed herein for enhanced intra-frequency CSI-RS L3 measurement. In certain aspects, computer-readable medium/memory 1112 stores code 1114 for receiving; code 1116 for determining; code 1118 for transmitting; code 1120 for enabling; code 1122 for disabling, etc. In certain aspects, the processor 1104 has circuitry configured to implement the code stored in the computer-readable medium/memory 1112. The processor 1104 includes circuitry 1124 for receiving; circuitry 1126 for determining; circuitry 1128 for transmitting; circuitry 1130 for enabling; code 1132 for disabling, etc.

EXAMPLE ASPECTS

Implementation examples are described in the following numbered clauses:

Clause 1: A method of wireless communication by a user equipment (UE), comprising: transmitting an indication based on a UE capability to simultaneously receive downlink data from a serving cell on one or more first resources and measure one or more channel state information (CSI) reference signals (CSI-RSs) from a target cell on one or more second resources, wherein the one or more first resources at least partially overlap the one or more second resources in a time domain and a frequency domain; and performing a CSI-RS measurement procedure, based on the UE capability.

Clause 2: The method according to clause 1, wherein performing the CSI-RS measurement procedure comprises simultaneously receiving the downlink data on the one or more first resources and measuring the one or more CSI-RSs on the one or more second resources, when the UE has the UE capability.

Clause 3: The method according to clause 2, wherein simultaneously receiving the downlink data and measuring the one or more CSI-RSs comprises receiving the downlink data and measuring the one or more CSI-RSs during a same orthogonal frequency division multiplexing (OFDM) symbol.

Clause 4: The method according to any of clauses 2-3, wherein the UE has the UE capability when the UE comprises a first processing engine configured to process the downlink data received on the one or more first resources and a second processing engine configured to process measurements of CSI-RSs on the one or more second resources.

Clause 5: The method according to clause 4, wherein: the first processing engine is configured to perform a first receive (Rx) Fast Fourier Transform (FFT) operation; and the second processing engine is configured to perform a second Rx FFT operation.

Clause 6: The method according to clause 5, wherein: the first Rx FFT operation is configured to use a first FFT window based on a first timing of the serving cell; and the second Rx FFT operation is configured to use a second FFT window based on a second timing of the target cell.

Clause 7: The method according to clause 1, wherein: when the UE does not have the UE capability, transmitting the indication comprises transmitting a first indication that the UE does not have the UE capability to a base station in the serving cell; and the method further comprises receiving, in response to the first indication, a second indication of a set of the one or more first resources that are blanked from a base station.

Clause 8: The method according to clause 7, wherein performing the CSI-RS measurement procedure comprises measuring the one or more CSI-RSs on the one or more second resources during the set of the one or more first resources.

Clause 9: The method according to clause 8, wherein: the UE does not have the UE capability when the UE comprises a single processing engine configured to process the downlink data and measure the one or more CSI-RSs; and the single processing engine is configured to use a first FFT window based on a first timing of the serving cell.

Clause 10: The method according to clause 9, wherein performing the CSI-RS measurement procedure further comprises reconfiguring the single processing engine to use a second FFT window based on a second timing of the target cell during the set of the one or more first resources.

Clause 11: A method for wireless communication by a base station in a serving cell, the method comprising: receiving, from a user equipment (UE), a first indication of whether the UE has a capability to simultaneously receive downlink data from the serving cell on one or more first resources and measure one or more channel state information (CSI) reference signals (CSI-RSs) from a first target cell on one or more second resources, wherein the one or more first resources at least partially overlap the one or more second resources in a time domain and a frequency domain; determining a configuration for scheduling transmission of the downlink data on the one or more first resources, based in part on the first indication; and transmitting a second indication of the configuration to the UE.

Clause 12: The method according to clause 11, wherein determining the configuration for scheduling transmission of the downlink data comprises determining whether to enable a blanking of at least one of the one or more first resources, based in part on the first indication.

Clause 13: The method according to clause 12, wherein: the first indication indicates that the UE does not have the capability; determining the configuration for scheduling transmission of the downlink data comprises determining to enable the blanking of the at least one of the one or more first resources; and the configuration comprises an indication of the at least one of the one or more first resources that is blanked.

Clause 14: The method according to clause 13, wherein a number of the at least one of the one or more first resources that is blanked is based on a timing of the serving cell and a timing of the first target cell.

Clause 15: The method according to any of clauses 13-14, wherein the at least one of the one or more first resources comprises a first orthogonal frequency division multiplexing (OFDM) symbol that overlaps with at least one OFDM symbol of the one or more second resources configured for measuring a CSI-RS.

Clause 16: The method according to clause 15, wherein the at least one of the one or more first resources further comprises: at least one second OFDM symbol that is adjacent and prior to the first OFDM symbol; and at least one third OFDM symbol that is adjacent and after the first OFDM symbol, wherein the at least one second OFDM symbol and the at least one third OFDM symbol are configured as guard symbols.

Clause 17: The method according to clause 12, wherein: the first indication indicates that the UE does have the capability; determining the configuration for scheduling transmission of the downlink data comprises determining to disable the blanking of the at least one of the one or more first resources; and the configuration indicates that the blanking is disabled for the at least one of the one or more first resources.

Clause 18: The method according to clause 12, further comprising determining one or more third resources for measuring CSI-RSs from a second target cell, wherein the configuration is further determined based in part on a timing of the first target cell and a timing of the second target cell.

Clause 19: The method according to clause 18, wherein the configuration comprises an indication of a number of guard symbols between the one or more second resources and the one or more third resources.

Clause 20: An apparatus comprising a processing system, a receiver, and a transmitter, the apparatus being configured to perform the method according to any of clauses 1-10.

Clause 21: An apparatus comprising a processing system, a receiver, and a transmitter, the apparatus being configured to perform the method according to any of clauses 11-19.

Clause 22: An apparatus comprising means for performing the method according to any of clauses 1-10.

Clause 23: An apparatus comprising means for performing the method according to any of clauses 11-19.

Clause 24: A non-transitory computer-readable medium comprising computer-executable instructions that, when executed by one or more processors of a processing system, cause a UE to perform the method according to any of clauses 1-10.

Clause 25: A non-transitory computer-readable medium comprising computer-executable instructions that, when executed by one or more processors of a processing system, cause a BS to perform the method according to any of clauses 11-19.

The techniques described herein may be used for various wireless communication technologies, such as NR (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

In 3GPP, the term "cell" can refer to a coverage area of a Node B (NB) and/or a NB subsystem serving this coverage area, depending on the context in which the term is used. In NR systems, the term "cell" and BS, next generation NodeB (gNB or gNodeB), access point (AP), distributed unit (DU), carrier, or transmission reception point (TRP) may be used interchangeably. A BS may provide communication coverage for a macro cell, a pico cell, a femto cell, and/or other types of cells. A macro cell may cover a relatively large geographic area (e.g., several kilometers in radius) and may allow unrestricted access by UEs with service subscription.

A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS.

A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

The methods disclosed herein comprise one or more steps or actions for achieving the methods. The method steps and/or actions may be interchanged with one another. In other words, unless a specific order of steps or actions is specified, the order and/or use of specific steps and/or actions may be modified.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, a digital signal processor (DSP), an application specific integrated circuit (ASIC), or a processor (e.g., a general purpose or specifically programmed processor). Generally, where there are operations illustrated in figures, those operations may have corresponding counterpart means-plus-function components with similar numbering.

For example, means for transmitting (or means for outputting for transmission) may include a transmitter and/or an antenna(s) 234 or the BS 110a or the transmitter unit 254 and/or antenna(s) 252 of the UE 120a illustrated in FIG. 2 and/or circuitry 1036 for transmitting of the communications device 1000 in FIG. 10 and/or circuitry 1128 for transmitting of the communications device 1100 in FIG. 11. Means for receiving (or means for obtaining) may include a receiver and/or an antenna(s) 234 of the BS 110a or a receiver and/or antenna(s) 252 of the UE 120a illustrated in FIG. 2 and/or circuitry 1038 for receiving of the communications device 1000 in FIG. 10 and/or circuitry 1124 for receiving of the communications device 1100 in FIG. 11. Means for communicating may include a transmitter, a receiver or both. Means for generating, means for performing, means for determining, means for taking action, means for determining, means for coordinating may include a processing system, which may include one or more processors, such as the transmit processor 220, the TX MIMO processor 230, the receive processor 238, and/or the controller/processor 240 of the BS 110a or the receive processor 258, the transmit processor 264, the TX MIMO processor 266, and/or controller/processor 280 of the UE 120a illustrated in FIG. 2 and/or the processing system 1002 of the communications device 1000 in FIG. 10 and/or the processing system 1102 of the communications device 1100 in FIG. 11.

The various illustrative logical blocks, modules and circuits described in connection with the present disclosure may be implemented or performed with a general purpose processor, a DSP, an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above can also be considered as examples of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein, for example, instructions for performing the operations described herein and illustrated in FIG. 8 and/or FIG. 9.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above.

The invention claimed is:

1. A method of wireless communication by a user equipment (UE), comprising:
    transmitting an indication based on a UE capability to simultaneously receive downlink data from a serving cell on one or more first resources and measure one or more channel state information (CSI) reference signals (CSI-RSs) from a target cell on one or more second resources, wherein the one or more first resources at least partially overlap the one or more second resources in a time domain and a frequency domain; and
    performing a CSI-RS measurement procedure, based on the UE capability, wherein:
    the UE lacks the UE capability when the UE comprises a single processing engine configured to process the downlink data and measure the one or more CSI-RSs, the single processing engine being configured to use a first Fast Fourier Transform (FFT) window based on a first timing of the serving cell; and
    when the UE lacks the UE capability, performing the CSI-RS measurement procedure comprises:
        reconfiguring the single processing engine to use a second FFT window based on a second timing of the target cell during a set of the one or more first resources; and
        using the reconfigured single processing engine to measure the one or more CSI-RSs on the one or more second resources during the set of the one or more first resources.

2. The method of claim 1, wherein performing the CSI-RS measurement procedure comprises simultaneously receiving the downlink data on the one or more first resources and measuring the one or more CSI-RSs on the one or more second resources, when the UE has the UE capability.

3. The method of claim 2, wherein simultaneously receiving the downlink data and measuring the one or more CSI-RSs comprises receiving the downlink data and measuring the one or more CSI-RSs during a same orthogonal frequency division multiplexing (OFDM) symbol.

4. The method of claim 2, wherein the UE has the UE capability when the UE comprises a first processing engine configured to process the downlink data received on the one or more first resources and a second processing engine configured to process measurements of CSI-RSs on the one or more second resources.

5. The method of claim 4, wherein:
    the first processing engine is configured to perform a first receive (Rx) FFT operation; and
    the second processing engine is configured to perform a second Rx FFT operation.

6. The method of claim 5, wherein:
    the first Rx FFT operation is configured to use the first FFT window based on the first timing of the serving cell; and the second Rx FFT operation is configured to use the second FFT window based on the second timing of the target cell.

7. The method of claim 1, wherein:
when the UE lacks the UE capability, transmitting the indication comprises transmitting a first indication that the UE lacks the UE capability to a base station in the serving cell; and
the method further comprises receiving, in response to the first indication, a second indication of a set of the one or more first resources that are blanked from a base station.

8. An apparatus for wireless communication, comprising:
a transmitter configured to transmit an indication based on a capability of the apparatus to simultaneously receive downlink data from a serving cell on one or more first resources and measure one or more channel state information (CSI) reference signals (CSI-RSs) from a target cell on one or more second resources, wherein the one or more first resources at least partially overlap the one or more second resources in a time domain and a frequency domain;
one or more processors collectively configured to perform a CSI-RS measurement procedure, based on the capability; and
one or more memories coupled to the one or more processors, wherein:
the apparatus lacks the capability when the apparatus comprises a single processing engine configured to process the downlink data and measure the one or more CSI-RSs, the single processing engine being configured to use a first Fast Fourier Transform (FFT) window based on a first timing of the serving cell; and
when the apparatus lacks the capability, in order to perform the CSI-RS measurement procedure, the one or more processors are collectively configured to:
reconfigure the single processing engine to use a second FFT window based on a second timing of the target cell during a set of the one or more first resources; and
use the reconfigured single processing engine to measure the one or more CSI-RSs on the one or more second resources during the set of the one or more first resources.

9. The apparatus of claim 8, further comprising a receiver configured to receive the downlink data on the one or more first resources, wherein the one or more processors are collectively configured to perform the CSI-RS measurement procedure by simultaneously processing the downlink data received on the one or more first resources and measuring the one or more CSI-RSs on the one or more second resources, when the apparatus has the capability.

10. The apparatus of claim 9, wherein the one or more processors are collectively configured to simultaneously process the downlink data and measure the one or more CSI-RSs during a same orthogonal frequency division multiplexing (OFDM) symbol.

11. The apparatus of claim 9, wherein the apparatus has the capability when the apparatus comprises a first processing engine configured to process the downlink data received on the one or more first resources and a second processing engine configured to process measurements of CSI-RSs on the one or more second resources.

12. The apparatus of claim 11, wherein:
the first processing engine is configured to perform a first receive (Rx) FFT operation; and
the second processing engine is configured to perform a second Rx FFT operation.

13. The apparatus of claim 12, wherein:
the first Rx FFT operation is configured to use the first FFT window based on the first timing of the serving cell; and
the second Rx FFT operation is configured to use the second FFT window based on the second timing of the target cell.

14. The apparatus of claim 8, wherein:
when the apparatus lacks the capability, transmitting the indication comprises transmitting a first indication that the apparatus lacks the capability to a base station in the serving cell; and
the apparatus further comprises a receiver configured to receive, in response to the first indication, a second indication of a set of the one or more first resources that are blanked from a base station.

15. A method for wireless communication by a base station in a serving cell, the method comprising:
receiving, from a user equipment (UE), a first indication of whether the UE has a capability to simultaneously receive downlink data from the serving cell on one or more first resources and measure one or more channel state information (CSI) reference signals (CSI-RSs) from a first target cell on one or more second resources, wherein the one or more first resources at least partially overlap the one or more second resources in a time domain and a frequency domain;
determining one or more third resources for measuring CSI-RSs from a second target cell;
determining a configuration for scheduling transmission of the downlink data on the one or more first resources, based in part on the first indication, a timing of the first target cell, and a timing of the second target cell; and
transmitting a second indication of the configuration to the UE.

16. The method of claim 15, wherein determining the configuration for scheduling transmission of the downlink data comprises determining whether to enable a blanking of at least one of the one or more first resources, based in part on the first indication.

17. The method of claim 16, wherein:
the first indication indicates that the UE lacks the capability;
determining the configuration for scheduling transmission of the downlink data comprises determining to enable the blanking of the at least one of the one or more first resources; and
the configuration comprises an indication of the at least one of the one or more first resources that is blanked.

18. The method of claim 17, wherein a number of the at least one of the one or more first resources that is blanked is based on a timing of the serving cell and a timing of the first target cell.

19. The method of claim 17, wherein the at least one of the one or more first resources comprises a first orthogonal frequency division multiplexing (OFDM) symbol that overlaps with at least one OFDM symbol of the one or more second resources configured for measuring a CSI-RS.

20. The method of claim 19, wherein the at least one of the one or more first resources further comprises:
at least one second OFDM symbol that is adjacent and prior to the first OFDM symbol; and
at least one third OFDM symbol that is adjacent and after the first OFDM symbol, wherein the at least one second OFDM symbol and the at least one third OFDM symbol are configured as guard symbols.

21. The method of claim 16, wherein:
the first indication indicates that the UE does have the capability;
determining the configuration for scheduling transmission of the downlink data comprises determining to disable the blanking of the at least one of the one or more first resources; and
the configuration indicates that the blanking is disabled for the at least one of the one or more first resources.

22. The method of claim 16, wherein the configuration comprises an indication of a number of guard symbols between the one or more second resources and the one or more third resources.

23. An apparatus for wireless communication, comprising:
a receiver configured to receive, from a user equipment (UE), a first indication of whether the UE has a capability to simultaneously receive downlink data from a serving cell on one or more first resources and measure one or more channel state information (CSI) reference signals (CSI-RSs) from a first target cell on one or more second resources, wherein the one or more first resources at least partially overlap the one or more second resources in a time domain and a frequency domain;
one or more processors collectively configured to:
determine one or more third resources for measuring CSI-RSs from a second target cell; and
determine a configuration for scheduling transmission of the downlink data on the one or more first resources, based in part on the first indication, a timing of the first target cell, and a timing of the second target cell;
a transmitter configured to transmit a second indication of the configuration to the UE; and
one or more memories coupled to the one or more processors.

24. The apparatus of claim 23, wherein the determination of the configuration comprises a determination of whether to enable a blanking of at least one of the one or more first resources, based in part on the first indication.

25. The apparatus of claim 24, wherein:
the first indication indicates that the UE lacks the capability;
the determination of the configuration comprises a determination to enable the blanking of the at least one of the one or more first resources; and
the configuration comprises an indication of the at least one of the one or more first resources that is blanked.

26. The apparatus of claim 25, wherein a number of the at least one of the one or more first resources that is blanked is based on a timing of the serving cell and a timing of the first target cell.

27. The apparatus of claim 25, wherein the at least one of the one or more first resources comprises a first orthogonal frequency division multiplexing (OFDM) symbol that overlaps with at least one OFDM symbol of the one or more second resources configured for measuring a CSI-RS.

28. The apparatus of claim 27, wherein the at least one of the one or more first resources further comprises:
at least one second OFDM symbol that is adjacent and prior to the first OFDM symbol; and
at least one third OFDM symbol that is adjacent and after the first OFDM symbol, wherein the at least one second OFDM symbol and the at least one third OFDM symbol are configured as guard symbols.

29. The apparatus of claim 24, wherein:
the first indication indicates that the UE does have the capability;
the determination of the configuration comprises a determination to disable the blanking of the at least one of the one or more first resources; and
the configuration indicates that the blanking is disabled for the at least one of the one or more first resources.

30. The apparatus of claim 24, wherein the configuration comprises an indication of a number of guard symbols between the one or more second resources and the one or more third resources.

* * * * *